United States Patent [19]
Gelles et al.

[11] Patent Number: 5,506,299
[45] Date of Patent: Apr. 9, 1996

[54] HIGH IMPACT RESISTANT BLENDS OF THERMOPLASTIC POLYAMIDES AND MODIFIED BLOCK COPOLYMERS

[75] Inventors: Richard Gelles; William P. Gergen, both of Houston, Tex.; Robert G. Lutz, Santa Rosa, Calif.; Michael J. Modic, Houston, Tex.

[73] Assignee: Shell Oil Company, Houston, Tex.

[21] Appl. No.: 262,192

[22] Filed: Jun. 20, 1994

Related U.S. Application Data

[62] Division of Ser. No. 863,370, Apr. 2, 1992, Pat. No. 5,371,141, which is a continuation of Ser. No. 724,013, Jul. 1, 1991, abandoned, which is a continuation of Ser. No. 243,382, Sep. 12, 1988, abandoned, which is a continuation-in-part of Ser. No. 761,120, Jul. 31, 1985, abandoned.

[51] Int. Cl.$^6$ .................................................... C08L 77/00
[52] U.S. Cl. ............................ 525/66; 525/74; 525/92 B
[58] Field of Search ........................... 525/66, 74, 92 B

[56] References Cited

U.S. PATENT DOCUMENTS

| | | | |
|---|---|---|---|
| 4,242,470 | 12/1980 | Gergen | 525/92 |
| 4,427,828 | 1/1984 | Hergenrother | 525/66 |
| 4,849,471 | 7/1989 | Saito et al. | 525/66 |

FOREIGN PATENT DOCUMENTS 85115  8/1983  European Pat. Off. .

*Primary Examiner*—Ralph H. Dean
*Attorney, Agent, or Firm*—Keith M. Tackett

[57] ABSTRACT

A super-toughened multiphase thermoplastic composition is provided by combining at least one modified selectively hydrogenated conjugated diene/alkenyl arene block copolymer to which has been grafted an effective amount of succinic groups primarily in the selectively hydrogenated conjugated diene blocks thereof and optionally at least one unmodified selectively hydrogenated conjugated diene/alkenyl arene block copolymer with at least one α,ω-polyamide.

6 Claims, 3 Drawing Sheets

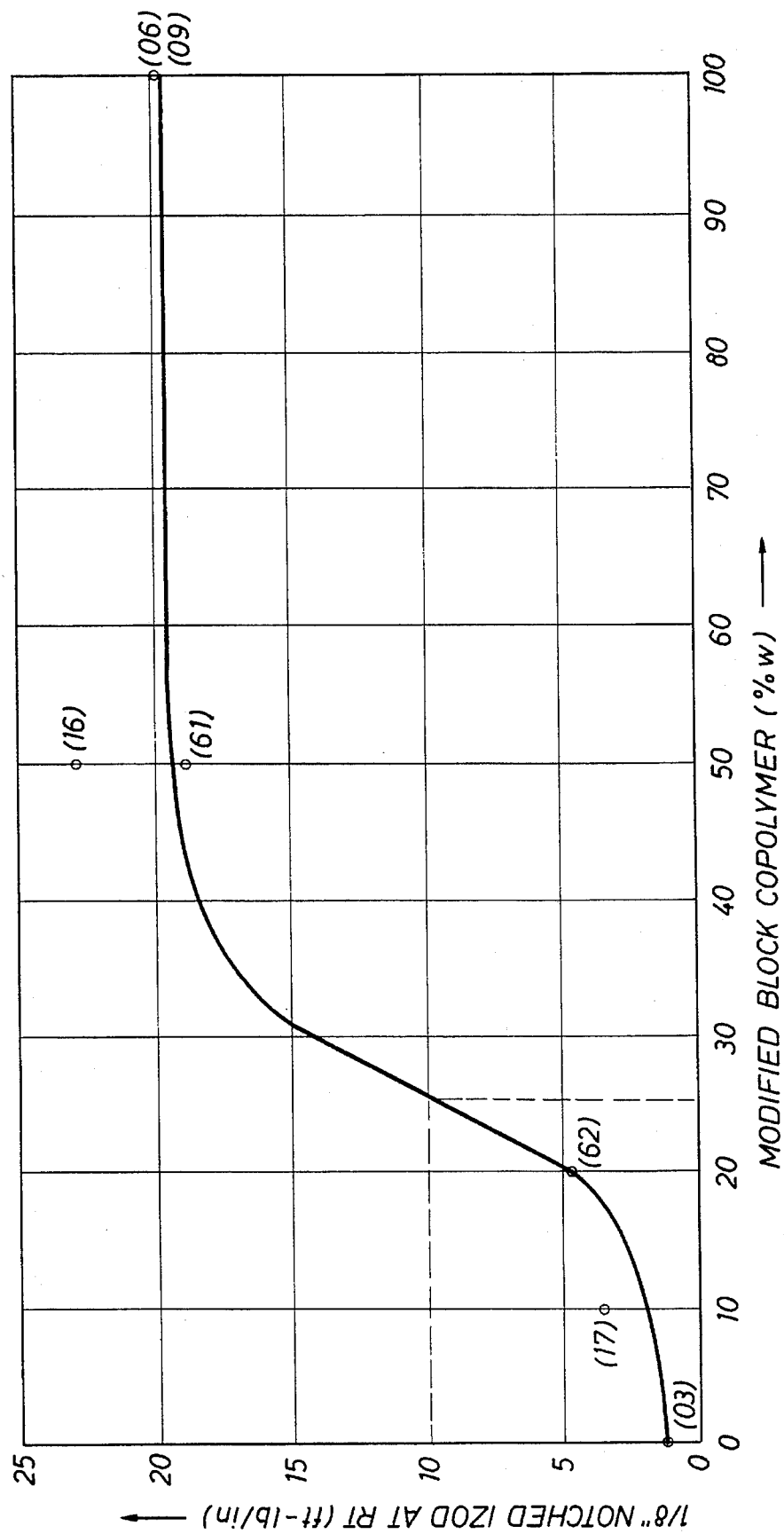

HIGH IMPACT RESISTANT BLENDS OF THERMOPLASTIC POLYAMIDES AND MODIFIED BLOCK COPOLYMERS

CROSS-REFERENCE TO RELATED APPLICATIONS

This is a division of application Ser. No. 07/863,370, filed Apr. 2, 1992, now U.S. Pat. No. 5,371,141 which is a continuation of Ser. No. 07/724,013, filed Jul. 1, 1991, now abn which is a continuation of Ser. No. 07/243,382, filed Sep. 12, 1988 now abn, which is a continuation-in-part of U.S. application Ser. No. 761,120, filed Jul. 31, 1985, now abn.

FIELD OF THE INVENTION

The present invention relates to an impact resistant polymeric composition. More particularly, it relates to an impact resistant polymeric composition comprising an $\alpha,107$-polyamide, a modified block copolymer and, optionally, an unmodified block copolymer. The modified block copolymer is obtained by modifying a first base block copolymer composed of a selectively hydrogenated conjugated diene polymer block and an alkenyl arene polymer block with a carboxyl containing functional group grafted primarily in the selectively hydrogenated conjugated diene block. The grafted functional groups are capable of forming cyclic anhydrides, preferably succinic groups. These carboxyl groups are preferably polycarboxylic acid groups and their cyclic anhydrides and more preferably dicarboxylic acid groups and their cyclic anhydrides. The optional unmodified block copolymer is a second base block copolymer composed of a selectively hydrogenated conjugated diene polymer block and an alkenyl arene polymer block.

BACKGROUND OF THE INVENTION

Thermoplastic polyamides, such as nylon 6 and nylon 6,6, are a class of materials which possess a good balance of properties comprising good elongation, high strength, high energy to break and stiffness which make them useful as structural materials. However, thermoplastic polyamides are quite sensitive to crack propagation. Consequently, a major deficiency of thermoplastic polyamides is their poor resistance to impact and their tendency to break in a brittle rather than ductile manner, especially when dry.

In general, improvements in the impact resistance of thermoplastic resins have been achieved by incorporating a low modulus rubber. Moreover, good dispersion of the rubber phase as well as developing adhesion between the rubber and matrix contribute to efficient impact modification of these resins.

It is well known to those skilled in the art that hydrogenated block copolymers of styrene and butadiene possess many of the properties useful for impact modification of plastics. These low modulus rubber materials display a low glass transition temperature, a characteristic advantageous for optimum toughening at lower temperatures. Furthermore, these block copolymers contain little unsaturation which facilitates their blending with high processing temperature plastics without significant degradation of the elastomer phase.

Block copolymers are unique impact modifiers compared to other rubbers in that they contain blocks which are microphase separated over the range of applications and processing conditions. These polymer segments may be tailored to become miscible with the resin to be modified. Good particle-matrix adhesion is obtained when different segments of the block copolymer reside in the matrix and in the rubber phase. This behavior is observed when hydrogenated block copolymer of styrene and butadiene are blended with resins such as polyolefins and polystyrene. Impact properties competitive with high impact polystyrene are obtained due to the compatibility of polystyrene with the polystyrene endblock of the block copolymer. Other polyolefins are toughened due to enhanced compatibility with the rubber segment.

Although the hydrogenated block copolymers do have many of the characteristics required for plastic impact modification, these materials are deficient as impact modifiers for many materials which are dissimilar in structure to styrene or hydrogenated butadiene. In particular, significant improvement in the impact resistance of polyamides with the addition of these hydrocarbon polymers has not been achieved. This result is due to poor interfacial interaction between the blend components and poor dispersion of the rubber particles. Poor interfacial adhesion affords areas of severe weakness in articles manufactured from such blends which when under impact result in facile mechanical failure.

The placement of functional groups onto the block copolymer may provide sites for interactions with such polar resins and, hence may extend the range of applicability of this elastomer. Such interactions, which include chemical reaction, hydrogen bonding and dipole interactions, are a route to achieving improved interfacial adhesion and particle dispersion, hence improved impact modification of polar thermoplastics.

Many attempts have been made to improve the impact properties of polyamides by adding low modulus modifiers which contain polar moieties as a result of polymerization or which have been modified to contain polar moieties by various grafting techniques. To this end, various compositions have been proposed utilizing such modifiers having carboxylic acid moieties and derivatives thereof, for example, Epstein in U.S. Pat. No. 4,174,358; Saito et al. in U.S. Pat. No. 4,429,076; Hergenrother et al. in U.S. Pat. No. 4,427,828; and Shiraki et al. in U.S. Pat. Nos. 4,628,072 and 4,657,971.

Epstein discloses a broad range of low modulus polyamide modifiers which have been prepared by free radical copolymerization of specific monomers with acid containing monomers. Alternatively, Epstein discloses the modification of polymers by grafting thereto specific carboxylic acid containing monomers. The grafting techniques allowed for therein are limited to thermal addition (ene reaction) and to nitrene insertion into C-H bonds or nitrene addition to C=C bonds (ethylenic unsaturation). Though Epstein does disclose a broad range of polyamide modifiers, Epstein does not disclose or suggest the utilization of hydrogenated copolymers of alkenyl arenes and conjugated dienes nor, more particularly, modified selectively hydrogenated copolymers of alkenyl arenes and conjugated dienes as polyamide modifiers.

Saito et al. disclose polyamide compositions which contain a modified unsaturated aromatic vinyl compound/conjugated diene block copolymer as a polyamide modifier. The unsaturated block copolymer has been modified by grafting a dicarboxylic acid group or derivative thereof (e.g. anhydride moieties) at a point of ethylchic unsaturation via thermal addition (ene reaction). However, such modifiers and compositions containing same are deficient in that the weatherability and resistance to thermal deterioration are poor; and, therefore, the polymers and compositions have been used only in the fields where such properties are not required. Furthermore, it is also noted that the ene reaction is a reversible reaction.

Hergenrother et al. and Shiraki et al. also describe a polyamide composition containing a block copolymer similar to that of Saito et al. However, in order to improve the weatherability and resistance to heat aging, both partially hydrogenate the block copolymer in their respective blends to an ethylchic unsaturation degree not exceeding 20 percent of the ethylchic unsaturation contained in the block copolymer prior to hydrogenation. Once the block copolymer is partially hydrogenated, the block copolymer is modified by grafting a molecular unit containing a carboxylic acid group and/or a group derived therefrom (e.g. anhydride moieties). Hergenrother et al. disclose grafting via thermal addition (ene reaction) utilizing the available residual unsaturation in the block copolymer. As such, Hergenrother et al. retained the deficiencies associated with the reversibility of the ene reaction. On the other hand, Shiraki et al. utilized free radical initiators to perform the grafting therein.

Though Shiraki et al. were apparently able to produce a nylon 6,6 blend possessing an Izod impact strength value at room temperature of about 14 ft.-lb./in. (75 kg.-cm/cm) (see Table 16 therein), such blends were apparently obtained solely by increasing the graft functionality levels to levels in excess of 4.0% w maleic anhydride utilizing a base (partially hydrogenated) block copolymer containing a residual ethylenic unsaturation of 10%. Additionally, there is no indication that such a blend when molded failed in a ductile, as opposed to brittle, manner during impact test utilized therein (ASTM D-256). Shiraki et al. were only interested in residual ethylenic unsaturation in the base block copolymers therein to the extent of improving weatherability.

However, there is a need to further reduce the graft functionality levels of the modified block copolymers utilized to impact modify $\alpha,\omega$-polyamides so as to eliminate, or at least minimize, processing problems relating to clogged vacuum systems, particularly with extruderbased modified block copolymer manufacturing systems. The vacuum systems are required for personal safety due to the hazardous nature of the modifiers utilized. An additional advantage to reducing graft functionality levels is cost reduction related to a reduction in the quantity of modifier used and to the costs associated to procure and operate the above-mentioned vacuum systems.

Further research and experimentation on polyamide compositions similar to those of Shiraki et al. have yielded unexpected and significant impact property improvements. In particular, super-toughened $\alpha,\omega$-polyamide blend compositions of the present invention are produced by regulating the proportion of the modified and optional unmodified block copolymers therein together with the degree of functionalization of the modified block copolymer and, particularly and quite surprisingly, the degree of ethylenic unsaturation of the unmodified and modified block copolymers.

To those skilled in the art, the degree to which the grafting reaction and phase size reduction occur, thereby promoting interfacial adhesion, together with the distribution of the rubber within the blend typically contribute to impact toughening of the blend. The results herein demonstrate that maintaining these three factors, i.e., unmodified and modified polymer content, degree of functionality and degree of ethylenic unsaturation of the unmodified and modified block copolymers, within specified limits promotes covalent bonding between the modified block copolymer and the $\alpha,\omega$-polyamide. Furthermore, the block copolymers also become well distributed in the polyamide phase. The super-tough blend compositions embodying the present invention are unexpected and surprising, i.e., that the blend of the $\alpha,\omega$-polyamide, the modified block copolymer with low graft functionality levels and the optional unmodified block copolymer (within certain relative proportions of unmodified to modified block copolymers) is uniquely super-tough whereas the blends of the $\alpha,107$-polyamide with either the unmodified block copolymer alone or when the proportion of the unmodified block copolymer to modified block copolymer exceeds effective amounts for super-toughening have not been observed to possess super-tough properties.

SUMMARY OF THE INVENTION

According to the present invention, there is provided a supertoughened multiphase thermoplastic composition comprising a thermoplastic $\alpha,107$-polyamide, an optional unmodified selectively hydrogenated alkenyl arene/conjugated diene block copolymer, and a modified selectively hydrogenated alkenyl arene/conjugated diene block copolymer wherein an effective amount of polycarboxyl functional groups, preferably succinic groups and more preferably dicarboxyl functional groups and cyclic anhydrides thereof, for super-toughening the multiphase thermoplastic composition are grafted to the modified block copolymer primarily in the selectively hydrogenated conjugated diene block(s) thereof. Furthermore, the composition is super-toughened by having an effective weight ratio of unmodified block copolymer to modified block copolymer for super-toughening.

More particularly, there is provided a super-toughened multiphase thermoplastic composition comprising:

a) one phase containing a thermoplastic $\alpha,\omega$-polyamide, and b) at least one other phase containing an effective amount of 1) at least one modified block copolymer and, 2) optionally, at least one unmodified block copolymer for super-toughening said composition, wherein c) the at least one other phase has an effective average phase size for super-toughening the composition, d) the modified block copolymer comprises 1) a first base block copolymer which comprises
   i) at least one polymer block A, the A block being at least predominantly a polymerized alkenyl arene block, and
   ii) at least one selectively hydrogenated polymer block B, the B block prior to hydrogenation being at least predominantly a polymerized conjugated diene block, 2) the modified block copolymer having grafted thereto on the average an effective amount of succinic groups for super-toughening the composition, 3) the succinic groups being present as carboxylic acids, cyclic anhydrides thereof or combinations thereof, and 4) wherein substantially all of the succinic groups are grafted to the first base block copolymer on the B blocks, and e) the optional unmodified block copolymer is a second base block copolymer which comprises 1) at least one polymer block C, the C block being at least predominantly a polymerized alkenyl arene block, and 2) at least one selectively hydrogenated polymer block D, the D block prior to hydrogenation being at least predominantly a polymerized conjugated diene block, and f) the unmodified and modified block copolymers each having an effective amount of residual ethylenic unsaturation in their respective base block copolymers for super-toughening the composition.

The blocks A and C may be polymer blocks of the same or different alkenyl arene. Likewise, the blocks B and D may be polymer blocks of the same or different conjugated diene. As such, the first and second base block copolymers may be the same or different block copolymer.

The modified block copolymer is preferably characterized as the reaction product of:

i) the first base block copolymer;

ii) an α,β-ethylenically unsaturated dicarboxylic acid reagent including cyclic anhydrides thereof containing 2 to about 20 carbon atoms-exclusive of the carboxyl groups therein in an amount effective for super-toughening the composition, preferably in amount of at least 0.2 percent by weight based upon the first base block copolymer; and iii) an effective amount of a free radical initiator for grafting component (ii) onto component (i) resulting in succinic groups grafted onto the first base block copolymer.

Furthermore, the unmodified and modified block copolymers may be linear or branched, with the term "branched" also including symmetric or asymmetric radial and star structures.

The effective amount of the at least one modified block copolymer and the optional unmodified block copolymer for super-toughening the composition comprises an effective combined amount of the optional unmodified block copolymer and the optional at least one modified block copolymer for super-toughening the composition and an effective weight ratio of the optional unmodified block copolymer to the optional at least one modified block copolymer. The effective combined amount of the optional one unmodified block copolymer and the at least one modified block copolymer for super-toughening the composition is preferably from about 15 to about 50 percent by weight for extruder modified block copolymer, and from about 25 to about 50 percent by weight for solution modified block copolymer, based on the α,107 -polyamide plus the block copolymers. The effective weight percent of the optional at least one unmodified block copolymer, when utilized with the at least one modified block copolymer, whether solution or extruder modified, is preferably from 0% w to about 75% w, more preferably from 0% w to about 60% w, based on the sum of the modified and unmodified block copolymer.

The effective amount of succinic groups for super-toughening the composition is on the average at least about 0.2% w succinic groups based on the first base block copolymer. Preferably, the succinic groups grafted to the functionalized block copolymer are present from about 0.2% w to about 20% w, more preferably from about 0.5% w to about 10% w and yet more preferably from about 0.5% w to about 3% w, based on said first base block copolymer. These succinic groups are present as carboxylic acids, cyclic anhydrides thereof or a combination of these two forms.

The effective average phase size of the at least one other phase for super-toughening the composition is on the average greater than about 0.06 μm and less than about 2.0 μm and preferably from about 0.1 μm to about 1.0 pm and more preferably from about 0.1 μm to about 0.5 μm. By "phase size" is meant either the diameter of a dispersed particle or the diameter or width of a cross-section of a partially continuous or continuous phase. The at least one other phase may be of the modified block copolymer; or when the modified block copolymer is utilized with unmodified block copolymer, the at least one other phase may comprise of a modified block copolymer phase, of an unmodified block copolymer phase, and of an unmodifed/modified block copolymers phase.

The effective amount of residual ethylenic unsaturation of the first and second base block copolymers for super-toughening the composition is preferably less than about 10 percent, more preferably less than about 5 percent and yet more preferably at most about 2 percent based on the original ethylenic unsaturation of the respective base block copolymer prior to hydrogenation.

Preferably, there is provided the super-toughened multiphase thermoplastic composition as defined above, wherein (a) each of the A and C blocks prior to hydrogenation is at least predominantly a polymerized monoalkenyl monocyclic arene block having an average molecular weight of about 1,000 to about 125,000, preferably about 1,000 to about 60,000, (b) each of the B and D blocks prior to hydrogenation is at least predominantly a polymerized conjugated diene block having an average molecular weight of about 10,000 to about 450,000, preferably about 10,000 to about 150,000, (c) the A and C blocks constitute between about 1 and about 99, preferably between about 2 and about 60, and more preferably between about 2 and 40, percent by weight of the first and second base block copolymer, respectively, (d) the unsaturation of the B and D blocks is less than about 10 percent, preferably less than about 5 percent and more preferably at most 2 percent, of the original unsaturation of the B and D blocks, respectively, (e) the unsaturation of the A and C blocks is greater than about 50 percent, preferably greater than about 90 percent, of the original unsaturation of the A and C blocks, respectively, and (f) the succinic group is preferably present on the average from about 0.2% w to about 20.0% w and more preferably on the average from about 0.5% w to about 10.0% w and yet more preferably on the average from about 0.5% w to about 3.0% w based on the molecular weight of said first base block copolymer.

Thus, although improvements may be obtained throughout the range of functionality levels, super-tough blends may be attainable by incorporating (1) an effective amount of the unmodified and modified block copolymers wherein the modified block copolymer contains (2) an effective amount of succinic groups and (3) the unmodified and modified block copolymers each contain an effective amount of ethylenic unsaturation together with (4) an effective phase size of the block copolymers within the α,ω-polyamide.

A composition is said to be super-toughened when an injection molded test specimen preferably has a ⅛ inch dry as molded notched Izod toughness value at room temperature (ASTM D-256) of at least about 10 ft-lb/in (about 54 Kg-cm/cm) and more importantly experiences ductile (i.e., sample hinges and does not break), as opposed to brittle, failure (i.e., sample breaks) during this test.

A feature of this invention lies in providing polymeric compositions which are processable in the melt and/or in solution and have improved mechanical properties, such as impact resistance.

Another feature of this invention lies in providing polymeric compositions which are considered super-tough.

Accordingly, these and other features and advantages of the present invention will become apparent from the following detailed description.

IN THE DRAWINGS

FIG. 5 is an x-y plot of ⅛ inch notched Izod at Room Temperature (ft-lb/in) versus Modified Block Copolymer Content (% w based on total block copolymer content, i.e. unmodified plus modified block copolymer content).

DETAILED DESCRIPTION OF THE INVENTION

Polyamides

Figure 1:
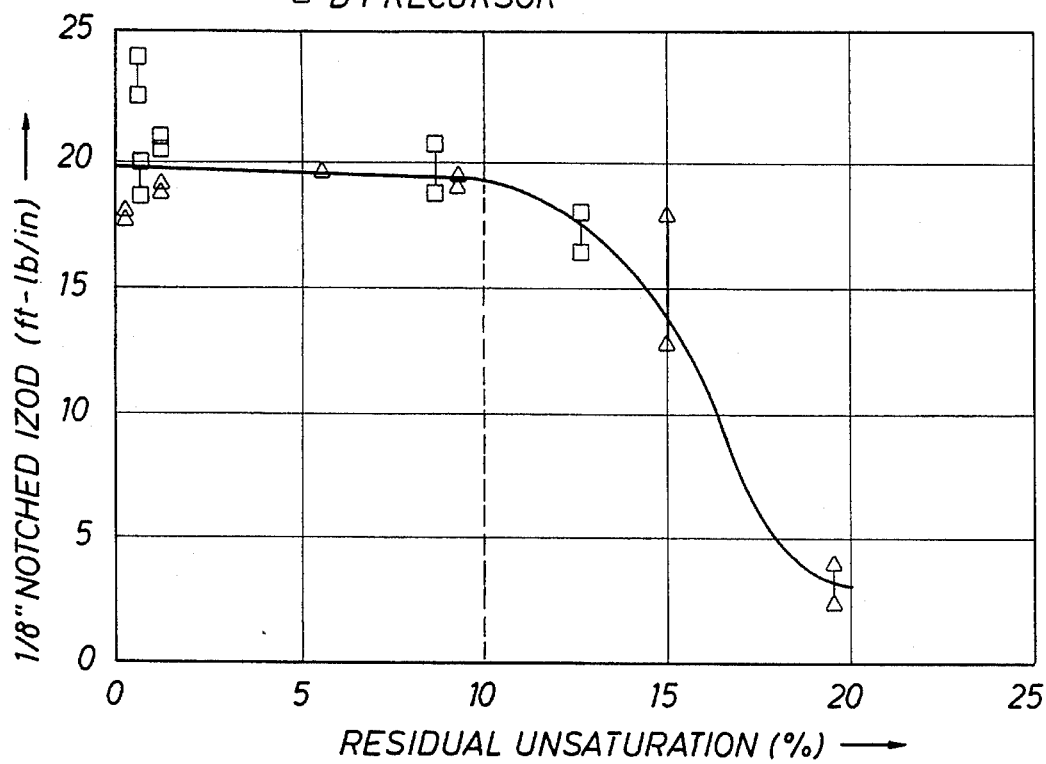
FIG. 1 is an x-y plot of ⅛ inch notched Izod at Room Temperature (ft-lb/in) versus Residual Unsaturation (%).

By polyamide is meant a condensation product which contains recurring aromatic and/or aliphatic amide groups as integral parts of the main polymer chain, such products being known generically as "nylons." The polyamide matrix of the toughened compositions of this invention is well known in the art and embraces those semi-crystalline and amorphous resins having a molecular weight of at least 5000 having a linear or branched structure. Preferably, these polyamides are $\alpha,\omega$-polyamides, as opposed to $\alpha$-polyamides. These $\alpha,107$ -polyamides have molecular weights of from about 5,000 to about 50,000. Furthermore, the $\alpha,\omega$-polyamides are preferably linear with a melting point in excess of 200° C.

By "$\alpha$-polyamides" is meant those polyamides having only one terminal group which strongly interacts or is reactive with the carboxyl functional groups of the block copolymer utilized in the compositions herein, such as an amine group. Examples of such $\alpha$-polyamides are those polyamides that may be obtained by polymerizing a monoaminocarboxylic acid or an internal lactam thereof having at least two carbon atoms between the amino and carboxylic acid groups thereof. Suitable polyamides include those described in U.S. Pat. Nos. 2,071,250; 2,071,251; 2,241,322; and 2,312,966.

As examples of the said monoaminocarboxylic acids or lactams thereof there may be mentioned those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned ε-aminocaproic acid, butyrolactam, pivalolactam, caprolactam, capryllactam, enantholactam, undecanolactam, dodecanolactam and 3- and 4-amino benzoic acids.

Illustrative examples of $\alpha$-polyamides which may be incorporated in the thermoplastic polymer blends of the invention include:

polypyrrolidone (nylon 4)
polycaprolactam (nylon 6)
polyheptolactam (nylon 7)
polycapryllactam (nylon 8)
polynonanolactam (nylon 9)
polyundecanolactam (nylon 11)
polydodecanolactam (nylon 12), It is also possible to use in this invention polyamides prepared by the copolymerization of two or more of the above polymers or terpolymerization of the above polymers or their components.

By "$\alpha,\omega$-polyamides" is meant those polyamides having at least two terminal groups, e.g. on each end of a linear polyamide, which strongly interact or are reactive with the carboxyl functional groups of the block copolymer utilized in the compositions herein. Preferably, these terminal groups are amines. Examples of such $\alpha,107$ -polyamides are those polyamides that may be obtained by polymerizing a diamine which contains at least two carbon atoms between the amino groups thereof and a dicarboxylic acid or ester thereof. Suitable $\alpha,107$ -polyamides include those described in U.S. Pat. Nos. 2,071,250; 2,071,251; 2,130,523; 2,130,948; and 3,393,210, the disclosures of which are herein incorporated by reference.

Typically, these polyamides are prepared by polymerizing substantially equimolar proportions of the diamine and the dicarboxylic acid. Furthermore, excess diamine may be employed to provide an excess of amine end groups over carboxyl end groups in the polyamide.

The term "substantially equimolecular proportions" (of the diamine and of the dicarboxylic acid) is used to cover both strict equimolecular proportions and the slight departures therefrom which are involved in conventional techniques for stabilizing the viscosity of the resultant polyamides.

Examples of the said diamines are diamines of the general formula $H_2N(CH_2)_nNH_2$ wherein n is an integer of from 2 to 16, such as trimethylenediamine, tetramethylenediamine, pentamethylenediamine, octamethylenediamine, decamethylenediamine, dodecamethylenediamine, hexadecamethylenediamine, and especially hexamethylenediamine.

C-alkylated diamines, e.g. 2,2-dimethylpentamethylenediamine and 2,2,4- and 2,4,4-trimethylhexamethylenediamine are further examples. Other diamines which may be mentioned as examples are aromatic diamines, e.g. p-phenylenediamine, 4,4'-diaminodiphenyl sulphone, 4,4'-diaminodiphenyl ether and 4,4'-diaminodiphenyl sulphone, 4,4'-diaminodiphenyl ether and 4,4'-diaminodiphenylmethane; and cycloaliphatic diamines, for example diaminodicyclohexylmethane.

The said dicarboxylic acids may be aromatic, for example isophthalic and terephthalic acids. Preferred dicarboxylic acids are of the formula HOOC—Y—COOH wherein Y represents a divalent aliphatic radical containing at least 2 carbon atoms, and examples of such acids are sebacic acid, octadecanedioic acid, suberic acid, azelaic acid, undecanedioic acid, glutaric acid, pimelic acid, and especially adipic acid. Oxalic acid is also a preferred acid. Furthermore, the dicarboxylic acid may be used in the form of a functional derivative thereof, for example an ester. Illustrative examples of $\alpha,107$ -polyamides include:

polyhexamethylene adipamide (nylon 6,6)

polyhexamethylene azelaiamide (nylon 6,9)

polyhexamethylene sebacamide (nylon 6,10)

polyhexamethylene isophthalamide (nylon 6,iP)

polyamide of hexamethylenediamine and n-dodecanedioic acid (nylon 6,12)

polyamide of dodecamethylenediamine and n-dodecanedioic acid (nylon 12,12).

Other $\alpha,107$ -polyamides may be prepared by the copolymerization of two or more of the above polymers or terpolymerization of the above polymers or their components.

Another α,107-polyamide is the nylon produced by Dynamit Nobel, which is the product of the dimethyl ester of terephthalic acid and a mixture of isomeric trimethyl hexamethylenediamine.

As earlier noted herein, the present invention embodies blends of α,ω-polyamides which possess super-tough properties. The preferred α,ω-polyamides herein include nylons 8,6; 6,3; and 6,12.

The amount of polyamide included in such compositions may vary widely depending upon the properties desired in the composition. For example, as great as 99 percent by weight of the composition may be composed of polyamide. However, the amounts of α,107-polyamide included in the "super-tough" compositions of the present invention preferably range from about 50 to about 90 percent by weight based on total weight of the α,107-polyamide and the block copolymers. More preferably, the amounts of α,ω-polyamide are from about 60 to about 90 percent by weight with a yet more preferred amount being from about 70 to about 85 percent by weight, as these amounts appear to impart excellent impact resistance to the finished composition.

Selectively Hydrogenated Block Copolymer Base Polymer

The selectively hydrogenated base block copolymers employed in the present invention may have a variety of geometrical structures, since the invention does not depend on any specific geometrical structure, but rather upon the chemical constitution of each of the polymer blocks, and subsequent modification of the block copolymer. The precursor of the first and second base block copolymers employed in the present composition are preferably thermoplastic elastomers and have at least one alkenyl arene polymer block A or C and at least one elastomeric conjugated diene polymer block B or D, respectively. To facilitate matters, reference within this portion of the specification shall be limited to blocks A and B with the understanding blocks A and C and blocks B and D are used interchangeably depending upon the particular base block copolymer being referenced. The number of blocks in the block copolymer is not of special importance and the macromolecular configuration may be linear or branched, which includes graft, radial or star configurations, depending upon the method by which the block copolymer is formed.

Typical examples of the various structures of the precursor block copolymers used in the present invention are represented as follow:

(A-B)n (A-S)n A (B-A)n B

[(A-B)p]m X

[(B-A)p]m X

[(A-B)pA]m X and

[(B-A)p B]m X wherein A is a polymer block of an alkenyl arene, B is a polymer block of a conjugated diene, X is a residual group of a polyfunctional coupling agent having two or more functional groups, n and p are, independently, integers of 1 to 20 and m is an integer of 2 to 40. Furthermore, the above-mentioned branched configurations may be either symmetrical or asymmetrical with respect to the blocks radiating from X.

A specific subset of the foregoing precursor block copolymers are the non-network forming block copolymers. "Non-network forming block copolymers" means those polymers having effectively only one alkenyl arene polymer block A. Structural configurations included therein are represented as follows:

$$B-A \qquad (1)$$

$$B-A-B \qquad (2)$$

$$(B-A)_n X \qquad (3)$$

$$(B-A)_y X (B)_z \qquad (4)$$

wherein A is a polymer block of an alkenyl arene, B is a polymer block of a conjugated diene, X is a residual group of a polyfunctional coupling agent having two or more functional groups, y and z are, independently, integers of 1 to 20 and n is an integer of 2 to 40. Furthermore, the above-mentioned branched configurations may be either symmetrical or asymmetrical with respect to the blocks radiating from X.

As is readily apparent from the foregoing structures, there is "effectively" only one alkenyl arene polymer block A. In structures (1) and (2) there is only one block A in each. In structures (3) and (4), each of the blocks A are molecularly attached to each other via a polyfunctional coupling agent and as such is in effect only one block A with B blocks radiating out therefrom. Thus, the physically crosslinked network structure formed by A-B-A type polymers utilizing the A block domains is not possible in these non-network forming block copolymers. Typical block copolymers of the most simple configuration (structure (1) above) would be polystyrene-polybutadiene (S-B) and polystyrene-polyisoprene (S-I).

It will be understood that both blocks A and B may be either homopolymer, random or tapered copolymer blocks as long as each block at least predominates in at least one class of the monomers characterizing the blocks defined hereinbefore. For example, blocks A may comprise styrene/alpha-methylstyrene copolymer blocks or styrene/butadiene random or tapered copolymer blocks as long as the blocks individually at least predominate in alkenyl arenes. The A blocks are preferably monoalkenyl arene. The term "monoalkenyl arene" will be taken to include particularly those of the benzene series such as styrene and its analogs and homologs including o-methylstyrene, p-methylstyrene, p-tert-butylstyrene, 1,3-dimethylstyrene, alpha-methylstyrene and other ring alkylated styrenes, particularly ring-methylated styrenes, and other monoalkenyl polycyclic aromatic compounds such as vinyl naphthalene, vinyl anthracene and the like. The preferred monoalkenyl arenes are monovinyl monocyclic arenes such as styrene and alpha-methylstyrene, and styrene is particularly preferred.

The blocks B may comprise homopolymers of conjugated diene monomers, copolymers of two or more conjugated dienes, and copolymers of one of the dienes with a monoalkenyl arene as long as the blocks B at least predominate in conjugated diene units. The conjugated dienes are preferably ones containing from 4 to 8 carbon atoms. Examples of such suitable conjugated diene monomers include: 1,3-butadiene (butadiene), 2-methyl-1,3-butadiene (isoprene), 2,3-dimethyl-1,3-butadiene, 1,3-pentadiene (piperylene), 1,3-hexadiene, and the like. Mixtures of such conjugated dienes may also be used. The preferred conjugated dienes are butadiene and isoprene.

Preferably, the block copolymers of conjugated dienes and alkenyl arene hydrocarbons which may be utilized include any of those which are low in modulus relative to the respective polyamide, preferably less than 1:10 (ratio of tensile modulus of block copolymer to tensile modulus of polyamide) and those butadiene derived elastomers which have 1,2-microstructure contents prior to hydrogenation of from about 7 to about 100 percent, preferably from about 25 to about 65 percent, more preferably from about 35 to about 55 percent. Such block copolymers may contain various ratios of conjugated dienes to alkenyl arenes. The proportion of the alkenyl arene blocks is between about 1 and about 99 percent by weight of the multiblock copolymer, preferably between about 2 and about 60 percent, more preferably between about 2 and about 55 percent by weight and particularly preferable between about 2 and about 40 percent by weight. When the alkenyl arene content is not more than about 60 percent by weight, preferably not more than about 55 percent by weight, the precursor block copolymer has characteristics as a rubbery (soft) polymer; and when the alkenyl arene content is greater than about 60 percent by weight, preferably more than about 70 percent by weight, the precursor block copolymer has characteristics as a resinous polymer.

The average molecular weights of the individual blocks may vary within certain limits. In most instances, the monoalkenyl arene blocks will have average molecular weights in the order of about 1,000 to about 125,000, preferably about 1,000 to about 60,000, while the conjugated diene blocks either before or after hydrogenation will have average molecular weights in the order of about 10,000 to about 450,000, preferably about 10,000 to about 150,000. The total average molecular weight of the multiblock copolymer is typically in the order of about 12,000 to about 700,000, preferably from about 12,000 to about 270,000. These molecular weights are most accurately determined by gel permeation chromatography.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627, the disclosures of which are incorporated herein by reference. As is well known in the block copolymer art, tapered copolymer blocks can be incorporated in the multiblock copolymer by copolymerizing a mixture of conjugated diene and alkenyl arene monomers utilizing the difference in their copolymerization reactivity rates. Various patents describe the preparation of multiblock copolymers containing tapered copolymer blocks including U.S. Pat. Nos. 3,251,905; 3,265,765; 3,639,521 and 4,208,356, the disclosures of which are incorporated herein by reference.

Though the afore-mentioned illustrative patents are slanted to producing network forming block copolymers (e.g. A-B-A), the non-network forming block copolymers of the present application may be prepared by an obvious variation or modification of these procedures; for example, 1) sequential polymerization of an A-B or B-A-B block copolymer; 2) utilizing a di-initiator to prepare a B-A-B block copolymer; 3) utilizing polyfunctional coupling agents to couple B-A-Li living copolymer segments to form a $(B-A)_n X$ polymer, where X is the residual portion of the polyfunctional coupling agent incorporated as part of the polymer whose presence therein is of insignificant effect to the properties of the resulting polymer and where n is the number of block copolymer segments or arms attached to X; and 4) similarly utilizing polyfunctional coupling agents to couple B-A-Li living copolymer segments and B-Li living homopolymer or diene copolymer segments to form a $(B-A)_y X-(B)_z$ polymer, where X is as before and y and z represent the number of respective segments or arms attached to X.

It should be observed that the above-described polymers and copolymers may, if desired, be readily prepared by the methods set forth above. However, since many of these polymers and copolymers are commercially available, it is usually preferred to employ the commercially available polymer as this serves to reduce the number of processing steps involved in the overall process.

These polymers and copolymers are preferably hydrogenated to increase their thermal stability and resistance to oxidation. The hydrogenation of these polymers and copolymers may be carried out by a variety of well established processes including hydrogenation in the presence of such catalysts as Raney Nickel, noble metals such as platinum, palladium and the like, and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. Re.27,145; 3,113,986; 3,700,633; 3,700,748; 3,763,044; 3,772,196; 3,965,019; 4,036,910; and 4,226,952, the disclosures of which are incorporated herein by reference. The polymers and copolymers are hydrogenated in such a manner as to produce hydrogenated polymers and copolymers having a residual ethylenic unsaturation content in the polydiene block of not more than about 20 percent, preferably less than about 10 percent, more preferably less than about 5 percent and yet more preferably at most about 2 percent, of their original ethylenic unsaturation content prior to hydrogenation. However, to produce the super-toughened composition of the present invention, the residual ethylenic unsaturation content in the polydiene block is preferably less than about 10 percent.

Modified Block Copolymers

The modified block copolymers according to the present invention are preferably grafted or substituted in the selectively hydrogenated conjugated diene block of the particular second base block copolymer by a free radically initiated reaction process as later described herein.

Depending upon the type of process and the reaction conditions, various free radical reactions are possible. Exemplary reactions are given below, utilizing an exemplary unit from a selectively hydrogenated conjugated diene segment of a suitable base block copolymer.

In the initial stages of free radical chemistry, the free radical species (from the initiator) may add to a double bond as follows:

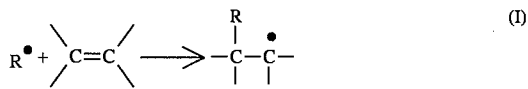

or may abstract a hydrogen atom as follows:

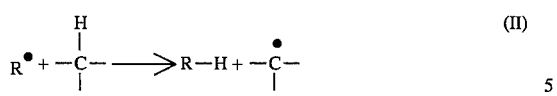
(II)

where the ease of formation of free radicals resulting from hydrogen abstraction follows the relationship of allylic >3°>2°>1° carbon center. However, in the selectively hydrogenated base block copolymer utilized herein, there exist very few (if any) allylic carbon centers; and, if they do, these allylic carbon centers for the most part would also be 3° or 2° carbon centers.

Once the free radical is located on the polymer itself, the following are exemplary (though not exhaustive) reactions relating to polymer bound radical chemistry:

A. Addition of α,β-ethylenically unsaturated dicarboxylic acids or cyclic anhydrides thereof (for example, maleic anhydride):

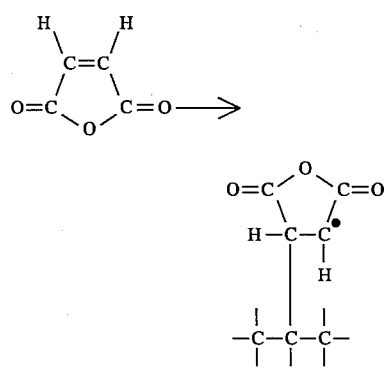
(III)

B. Dimerization (Coupling):

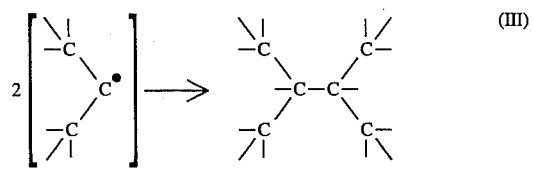
(III)

C. Elimination of a hydrogen radical:

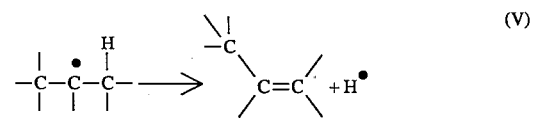
(V)

D. Abstraction of hydrogen from another polymer:

(VI)

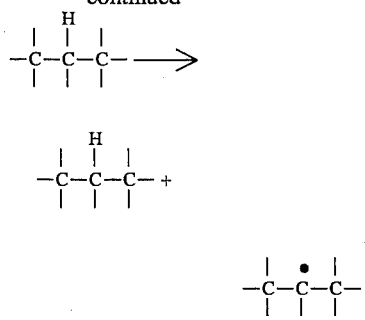

E. Abstraction of hydrogen from a solvent (in solution process):

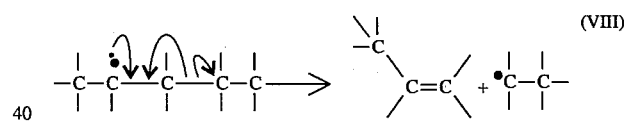
(VII)

solvent radical

F. Chain scission (cleavage) (typically not a favored reaction in solution process; however, in a melt-mixing process with the input of mechanical energy, this reaction does occur):

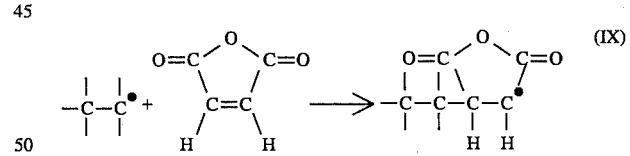
(VIII)

G. Addition of α,β-unsaturated dicarboxylic acids or cyclic anhydrides thereof to radical product of equation VIII:

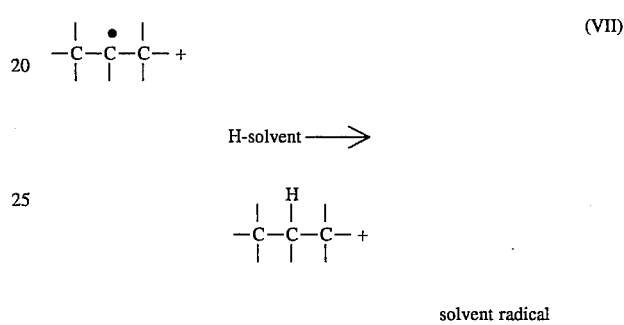
(IX)

Once the α,β-ethylenically unsaturated dicarboxylic acid radical or cyclic anhydrides thereof (for example, maleic anhydride radical which may also be referred to as a succinic group radial) is bound to the polymer itself, the following are exemplary (though not exhaustive) reactions relating to polymer bound maleic anhydride radical chemistry:

A. Abstraction of hydrogen from another polymer:
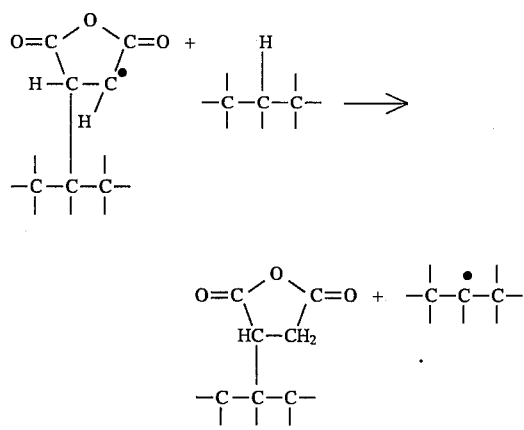
(X)
B. Abstraction of hydrogen from a solvent (in a solution process):
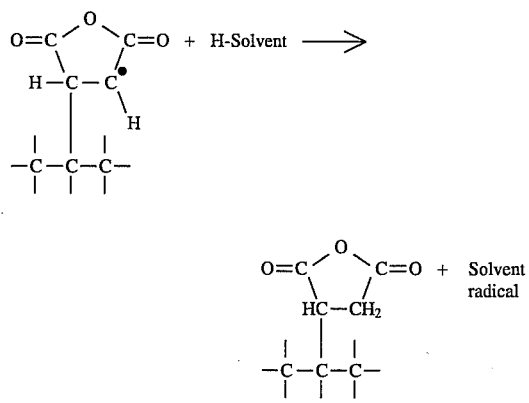
(XI)
C. Oligomerization with additional maleic anhydride:
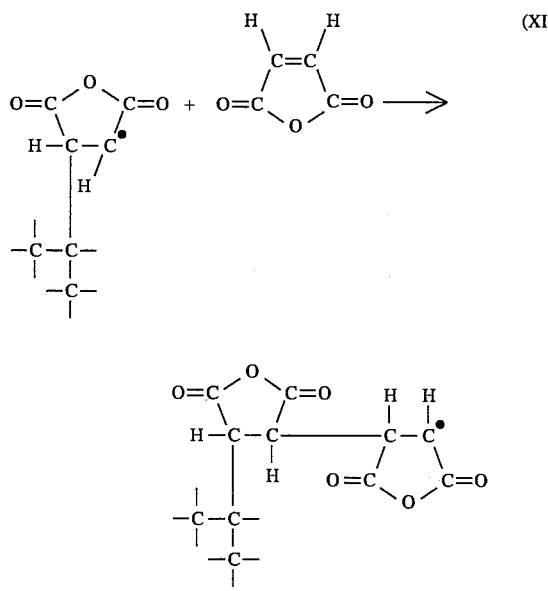
(XII)(a)
(XII)(b)
D. Dimerization (Coupling):
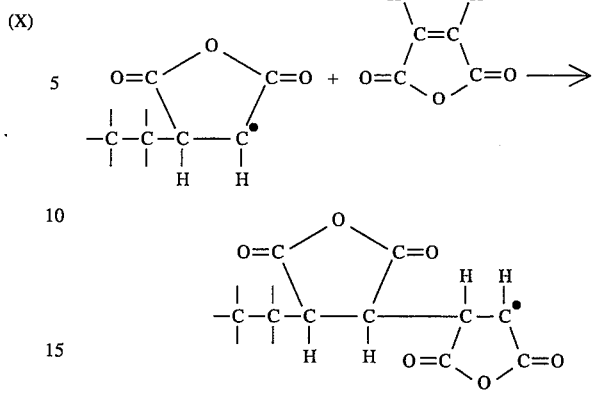
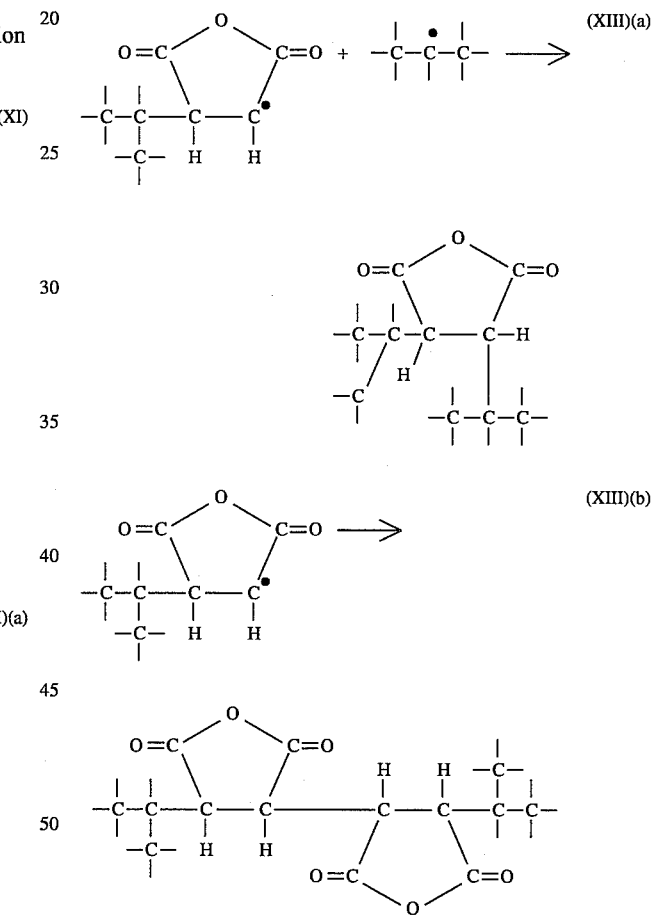
(XIII)(a)
(XIII)(b)
E. Elimination of a hydrogen radical:
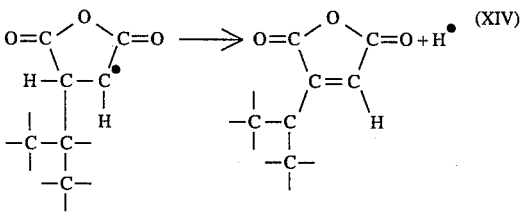
(XIV)

Additional reactions involving permutations and combinations of the foregoing reactions are also possible.

As is readily apparent from the foregoing, free radically initiated reactions of this type produces a variety of products some of which may be more favored than others depending upon the reaction conditions and process, i.e. solution (i.e. free radically initiated reaction in the presence of a solvent) or melt-mixing (i.e. a solvent-free free radically initiated reaction) process, utilized to perform the grafting reaction. For example, a solution process, say at room temperature, favors addition across carbon-carbon double bonds in stoichiometric quantities relative to the free radical initiator added and also favors coupling reactions. However, oligomerization is disfavored. In a melt-mixing process utilizing elevated temperatures and introducing mechanical energy via high shear mixing equipment such an extruder, the free radically initiated reaction becomes catalytic, rather than stoichiometric, with respect to the quantity of free radical initiator added. Though not wishing to be bound to any particular theory, this catalytic nature may be explained in terms of hydrogen abstraction once the $\alpha,\beta$-ethylenically unsaturated dicarboxylic acid or cyclic anhydride thereof is grafted to the polymer, thereby forming another polymer radical (radical transfer mechanism). Additionally, at these reaction conditions, oligomerization of the $\alpha,\beta$-ethylenically unsaturated dicarboxylic acid or cyclic anhydride thereof is also favored and competes with the radical transfer mechanism. Furthermore, chain scissioning is also favored, thereby creating additional polymer radicals. It has been observed that the solution process produces a significant amount of dimer produces a significant amount of scissioned material together to a lesser extent a dimer product.

Grafted Compounds

As earlier noted herein, the respective base block copolymer is modified by grafting carboxyl functional groups capable of forming cyclic anhydride groups once grafted thereon, whereby a modified block copolymer to be used in the super-toughened composition embodying the present invention is obtained. These modifiers must contain at least one site of ethylenic unsaturation in order to take part in the free radical initiated grafting reaction. Preferably, these modifiers are ethylenically unsaturated carboxylic acids and anhydrides thereof having 2 to 10 carbon atoms excluding those in the carboxyl and/or anhydride groups thereof. Such modifiers may be ethylenically unsaturated monocarboxylic acids and ethylenically unsaturated polycarboxylic acids and cyclic anhydrides thereof. The grafting reaction may take place in solution and/or in the melt.

The modifiers may be polymerizable or nonpolymerizable, however, preferred monomers are nonpolymerizable or slowly polymerizing so as to minimize dimerization and oligomerization. It is believed that by grafting unsaturated modifiers which have a slow polymerization rate, the resulting graft copolymers contain little or no homopolymer of the unsaturated modifier and, if oligomers are present, the short grafted modifier chains (i.e., oligomers) are such that they do not phase separate into separate domains.

With monocarboxylic acid modifiers, for example, acrylic acid methacrylic acid, crotonic acid, isocrotonic acid and angelic acid, at least two of these monomer units are preferably oligomerized per graft site so as to be capable of forming a cyclic anhydride.

The preferred cyclic anhydride group or acid derivative thereof grafted to the modified block copolymers hereof are succinic anhydride groups and their corresponding succinic acid groups which are collectively termed "succinic groups".

The class of preferred modifiers which yield such succinic groups on the modified block copolymers utilized herein are ethylenically unsaturated polycarboxylic acids and cyclic anhydrides thereof, more preferably ethylenically unsaturated dicarboxylic acids and cyclic anhydrides thereof and most preferably $\alpha,\beta$-ethylenically unsaturated dicarboxylic acids.

Examples of such modifiers include, but are not limited to, maleic acid, fumaric acid, maleic anhydride, itaconic acid, itaconic anhydride, citraconic acid, mesaconic acid, citraconic -anhydride, aconitic acid (a tricarboxylic acid), aconitic anhydride, cis-4-cyclohexene-1,2-dicarboxylic acid, cis-4-cyclohexene-1,2-dicarboxylic anhydride, endo-cis-bicyclo (2,2,1)-5-heptene-2,3-dicarboxylic acid, and endo-cis-bicylco (2,2,1)-5-heptene-2,3-dicarboxylic arthydride. These modifiers may be used alone or in combination thereof. Among these modifiers, maleic acid, fumaric acid and maleic anhydride are particularly preferred, with maleic anhydride most preferred. It is noted that during the free radical initiated grafting reaction fumaric acid isomerizes to form the desired succinic group grafted on the resulting modified block copolymer.

The grafted polymer will usually contain from 0.02 to 20, preferably 0.1 to 10, and most preferably 0.2 to 5 weight percent of grafted portion as the mean value in the entire modified block copolymers used in the present invention.

The effective amount of succinic group functionality for super-toughening the composition (polyamide blend) is that amount which yields a composition which, when injection molded, preferably has a 1/8-inch dry as molded notched izod toughness value at room temperature (ASTM D-256) of at least about 10 ft-lb/in (about 54 Kg-cm/cm) and more importantly experiences ductile, as opposed to brittle, failure during this test. This effective amount of succinic group functionality is on the average at least about 0.2% w succinic groups (e.g. grafted maleic anhydride groups) based on the base block copolymer. Preferably, the functionality level is on the average from about 0.2% w to about 20% w, more preferably on the average from about 0.5% w to about 10% w, and yet more preferably on the average from about 0.5% w to about 3% w. A functionality level of at most 3% w is advantageous in that processing problems relating to clogged vacuum systems in solvent free reaction processes are significantly minimized, if not eliminated.

Preparation of the Modified Polymers

The modified block copolymer for blending according to the present invention may be prepared by any convenient manner. Preferably, the polymer is prepared such that at least one modifier selected from unsaturated carboxylic acids and anhydride derivatives thereof is grafted onto the selectively hydrogenated conjugated diene portion of the polymer via a free radically initiated reaction. The graft reaction may be carried out by solution or melt-mixing the base block copolymer and the unsaturated carboxylic acid (and/or derivative thereof, e.g. anhydride) in the presence of a free radical initiator. Disclosures for such processes are found in U.S. Pat. Nos. 4,033,888; 4,077,893; and 4,670,173 for solution processes and in U.S. Pat. Nos. 4,427,828; 4,578,429; 4,628,072; and 4,657,971 for melt-mixing processes.

The grafting reaction is initiated by a free-radical initiator which is preferably a peroxy compound and more preferably an organic peroxygen compound. Preferred organic peroxides include benzoyl peroxide, 2,5-dimethyl-2,5-di(t-butylperoxy)hexane, di-t-butyl peroxide, 2,5'-dimethyl- 2,5-di-tert-butylperoxy-3-hexyne (Lupersol 130), $\alpha,\alpha'$-bis(tert-butylperoxy)diisopropyl benzene (VulCup R), or any free radical initiator having a convenient (short) half-life under the base polymer processing conditions. Additionally, in the solution process, the free radical initiator is preferably soluble in the reaction mixture. See pp. 66–67 of *Modern Plastics,* November 1971, for a more complete list of such compounds. Mixtures of two or more of the above peroxides may also be used.

The concentration of the initiator used to prepare the polymer may also vary between wide limits and is determined by the desired degree of functionalization of the polymer, the reaction temperature and degradation allowable. In a solution process, typical concentrations based on polymer content range from about 0.001 to 50.0 weight percent, more preferably, between 0.1 and 5.0 weight percent. In a melt-mixing process, typical concentration based on polymer content range from about 0.001 to about 5.0 weight percent, more preferably from about 0.01 to about 1.0 weight percent.

Reaction temperatures and pressures should be sufficient to thermally decompose the free radical initiator to form the free radical. Additionally, in a solvent free melt-mix process, the reaction conditions should be sufficient to melt the reactants. As such, the reaction temperatures would depend on the base polymer and the free radical initiator being used.

In a solution process, the temperature at which the reaction is carried out may vary within wide limits such as from about 0° C. to about 300° C., preferably from about 20° C. to about 200° C. The reaction may be carried out in an inert atmosphere, such as nitrogen, and may be carried out under pressure depending upon the vapor pressure of the solvent used at the selected reaction conditions. Typical reaction conditions such as these may be obtained by using, for example, an autoclave-type reactor to heat the reactant mixture to the desired reaction temperature.

The solvents that may be used in this solution process are preferably inert liquid solvents such as hydrocarbons, e.g., aliphatic and aromatic hydrocarbons. Suitable aliphatic hydrocarbon solvents include, but are not limited to, pentane, hexane, heptane, octane, 2-ethylhexane, nonane, decane, cyclohexane and methylcyclohexane. Suitable aromatic hydrocarbon solvents include, but are not limited to, benzene, toluene, ethylbenzene, the xylenes, diethylbenzenes, and propylbenzenes. Mixtures of hydrocarbons, e.g., lubricating oil, may also be utilized.

In a melt-mixing process, the temperatures useful in the reaction of this process, may also vary within wide limits such as from about 75° C. to about 450° C., preferably from about 200° C. to about 300° C. Typical reaction conditions such as these may be obtained by using a screw type extruder to mix and melt the reactants and to heat the reactant mixture to the desired reaction temperature. Additionally, flow promoters such as oils, low molecular weight resins, or other polymers may be included in the reaction mixture during the functionalization step.

The functionalization utilized herein is highly flexible and a great many modifications such as those proposed above are available to carry out any particular purpose desired.

Of course, any of the standard additives can be used with these modified polymers. They include conventional heat stabilizers, slip-agents, antioxidants, antistatic agents, colorants, flame retardants, heat stabilizers, plasticizers, preservatives, processing aids and the like.

Preparation of the Final Compositions

The toughened thermoplastic polymer compositions of the present invention can be readily prepared by using any conventional mixing apparatus which is normally used for mixing or blending of polymer substances. Examples of such apparatus are single or multiple screw extruders, mixing rollers, Brabender, Banbury mills, kneaders and the like. An example of a multiple screw extruder is a Werner Pfleiderer extruder having generally 21–5 kneading blocks and at least one reverse pitch to generate high shear. Alternatively, the blends may be made by coprecipitation from solution, blending or by dry mixing together of the components, followed by melt fabrication of the dry mixture by extrusion.

The polyamide blends of the present invention may be prepared by melt-blending (a) the desired proportion of $\alpha,\omega$-polyamide, ranging from about 50 percent to about 99 percent, with (b) the desired combined proportion of the modified block copolymer and optionally unmodified block copolymer, ranging from about 1 percent to about 50 percent. Taking economic and commercial considerations into account, the proportion of polyamide preferably ranges from about 70 percent to about 95 percent, or most preferably ranges from about 70 percent to about 90 percent, with the modified block copolymer making up the difference in the polyamide/block copolymer blend. However, to produce a super-toughened $\alpha,\omega$-polyamide blend, the proportion of polyamide preferably ranges from about 50 to about 85 percent, more preferably from about 60 to about 85 percent when extruder modified block copolymers are utilized and from about 50 to about 75 percent, more preferably from about 60 to about 75 percent when solution modified block copolymers are utilized based on (a) plus (b). Correspondingly, the combined proportion of the unmodified (optional) and modified block copolymers in such super-toughened $\alpha,\omega$-polyamide blends preferably ranges from about 50 to about 15 percent, more preferably from about 40 to about 15 percent when extruder modified and from about 50 to about 25 percent, more preferably from about 40 to about 25 percent when solution modified based on the $\alpha,\omega$-polyamide(s) plus the block copolymer(s). Furthermore, the effective weight ratio of the unmodified to modified block copolymers preferably ranges from about 75:25 to about 0:100, more preferably from about 60:40 to about 0:100. In other words, the effective weight percent of the unmodified block copolymer ranges from 0% w to about 75% w, preferably from 0% w to about 60% w, based on the sum of the uumodified and modified block copolymers.

The impact properties of the blends of this invention are improved as characterized by a higher notched Izod value over either the polyamide alone or in a blend with the unmodified block copolymer. The degree of impact properties desired may be controlled and varied by varying the degree of functionality (amount of functionality) of the modified block copolymer and the degree of ethylenic unsaturation of the copolymers employed in the blend composition. Within this range of possible functionality and ethylenic unsaturation together with the proper proportion of unmodified and modified block copolymers, blends considered to be "super-tough" may be attained. A blend is considered to be "super-tough" herein when its ⅛-inch notched Izod at room temperature (ASTM D-256) is preferably at least about 10 ft-lb/in and, more importantly the blend experiences a ductile failure, as opposed to a brittle failure, during this test.

The effective amount of succinic group functionality for supertoughening the composition (polyamide blend) is that amount which yields a composition which when injection molded preferably has a 1/8-inch dry as molded notched Izod toughness value at room temperature (ASTM D-256) of at least about 10 ft-lb/in (about 54 Kg-cm/cm) and more important experiences ductile, as opposed to brittle, failure during this test. This effective amount of succinic group functionality is on the average at least about 0.2% w of succinic groups (e.g. grafted maleic acid or maleic anhydride) based on the base block copolymer. Preferably, the functionality level is on the average from about 0.2% w to about 20% w of succinic groups, more preferably on the average from about 0.5% w to about 10% w, and yet more preferably on the average from about 0.5% w to about 3% w.

This maximum functionality levels of 3% w is advantageous in that processing problems relating to clogged vacuum systems are minimized, if not eliminated. Due to the hazardous nature of the modifiers utilized in manufacturing the modified block copolymers herein, vacuum systems are utilized to safeguard operating personnel. Additionally, reducing the amount of modifier yields a cost savings not only as to the amount of modifier utilized but also costs associated with the purchase and operations of the vacuum system.

The effective amount of residual ethylenic unsaturation of either the first or second base block copolymer is less than about 10% of the original ethylenic unsaturation of the precursor block copolymer prior to hydrogenation, preferably less than about 5% and more preferably at most about 2%.

The improvement in toughness of the compositions herein is related to the amount of adherent sites in the modified block copolymer component and the degree of block copolymer distribution. Phase size is utilized as a measurement of the degree of block copolymer distribution. Phase size is either the cross-sectional width of a section (cell) of a continuous phase or the diameter of a discrete particle.

The mechanism of adhesion and the role of the copolymer/polyamide interface to promote rubber (block copolymer) dispersion is not entirely understood. However, it appears that grafting reactions or strong interactions between the modified block copolymer and the polyamide do occur. To some extent, enhancing the extent of reaction or interaction appears to facilitate rubber distribution. Moreover, it appears that by increasing the block copolymer/polyamide interface more sites are made available for the unknown mechanism herein to operate upon. Therefore, regardless of whether the unmodified and modified block copolymers may be continuous, partially continuous or dispersed within the polyamide, the block copolymers are preferably present therein in a sufficiently small phase size. The level of succinic group functionality and grafting appears critical to distributing the polymers within the polyamide and developing the appropriate stress distributions to induce matrix deformation and energy absorption. However, the present results, at least with α-polyamides, demonstrate that too small a phase size is detrimental to the impact properties of such blends.

The super-tough blend compositions herein are unexpected and surprising; particularly, in the dissimilarity between α-polyamides and α,ω-polyamides in such blend compositions. In the absence of the unmodified block copolymer, the modified block copolymers utilized herein are more effective in toughening nylon 6,6 than nylon 6. The potential grafting reaction is facilitated between the polyamide and the succinic group functionality in the modified block copolymer due to the enhanced probability of the strong interaction or reaction observed in α-polyamides which may result in too small a phase size to effect supertoughening in such blends.

A characteristic feature of the α-polyamides, such nylon 6, is that these polyamides have only one terminal reactive or interactive group, an amine. However, α,ω-polyamides, such as nylon 6,6, have terminal reactive or interactive groups on each end. Thus, though not wishing to be bound to any particular theory, it is currently believed that if each of these two terminal reactive or interactive groups, particularly amine groups, react with a succinic group to form cyclic imides on a different modified block copolymer molecule, then the graft α,107 -polyamide molecules become tie molecules which covalently, as opposed to physically, crosslink the polyamide/modified block copolymer system into a three-dimensional network. The formation of such a network at the interface between the polyamide and modified block copolymer phases has two interrelated effects. Firstly, in a static sense, such a network at this interface would effectively reduce or prevent further reaction between the two phases by reducing and eventually prevent diffusion of the reactive species to the interface. Secondly, in a dynamic sense, once this covalent crosslinking has ensued, the flow or rheological characteristics of the two phases are severely restricted, thereby further reducing the ability of the two phases to further disperse during blending and allow reactive species to diffuse to the interface. On the other hand, as the α-polyamides, such as nylon 6, are monofunctional in the sense that they have only one reactive or interactive terminal group, α,ω-polyamides are unable to covalently crosslink the polyamide/modified block copolymer interface. Thus, the diffusion and rheological characteristics of such blends favor better dispersion and a higher probability of exposing additional reactive species at the interface. Hence, the extent of grafting in the nylon 6,6 system is kept in check and may not achieve too small of a phase size for impact modification purposes. However, the nylon 6, being rather reactive and unbridled in this sense, continues to pursue the grafting reaction and is able to achieve a phase size which is too small to impart supertoughened characteristics to articles formed from such binary blends.

The foregoing discussion regarding the grafting reaction between the respective polyamide and the modified block copolymers herein forms the basis for a cautionary note. It is preferred that excess maleic anhydride, or like graftable species utilized, which is not grafted, i.e. free, be removed prior to blending compositions incorporating such modified block copolymers therein. The reason is quite obvious in that the free maleic anhydride will compete with the grafted maleic anyhdride in the grafting reaction with reactable polyamide groups. As such, the free maleic anhydride being more mobile will decrease the number of polyamide sites available for the grafted maleic anhydride, thereby reducing the adhesion between the polymer and the polyamide and decrease the extent of impact modification enhancement. A reduction of from about 10% to about 50% in impact strength at room temperature (ASTM D-256 ⅛" notch) has been observed when about 2% w free maleic arthydride was blended with a modified block copolymer containing 2% w grafted maleic anhydride and a nylon 6,6 in a weight ratio of polymer to nylon 6,6 of 20:80.

The polymer compositions of the present invention can further contain other conventional additives. Examples of such additives are reinforcing materials such as silica, carbon black, clay, glass fibers, organic fibers, calcium carbonate and the like, as well as stabilizers and inhibitors of oxidative, thermal, and ultraviolet light degradation, lubricants and mold release agents, colorants including dyes and pigments, nucleating agents, fire retardants, plasticizers, etc.

The stabilizers can be incorporated into the composition at any stage in the preparation of the thermoplastic composition. Preferably, the stabilizers are included early to preclude the initiation of degradation before the composition can be protected. Such stabilizers must be compatible with the composition.

The compositions of the present invention can be readily molded or formed into various kinds of useful articles by using any conventional molding, injection molding, blow molding, pressure forming, rotational molding and the like. Examples of the articles are sheets, films, foamed products as well as injection-molded articles, blow-molded articles, pressure-formed articles and rotational-molded articles having various kinds of shapes. These articles can be used in the fields of, for example, automobile parts, electrical parts, mechanical parts, packaging materials, building materials and the like.

To assist those skilled in the art in the practice of this invention, the following Examples are set forth as illustrations. It is to be understood that in the specification and claims herein, unless otherwise indicated, when the amount of the polyamide or block copolymer is expressed in terms of percent by weight, it is meant percent by weight based on the total amount of these materials which is employed in the melt-blending. Furthermore, it is to be understood that, unless otherwise indicated, when the amount of succinic group, i.e. functionality level, is expressed in terms of percent by weight (% w), it is meant percent by weight based on the corresponding base block copolymer. In these Examples, injection molded bars of these compositions were tested using the following test procedures in the dry-as-molded state:

Notched Izod toughness: at each end ASTMD-256
Flexural Modulus: ASTM D-790

Examples of the Invention

Having thus broadly described the present invention, it is believed that the same will become even more apparent by reference to the following examples. It will be appreciated, however, that the examples are presented solely for the purposes of illustration and should not be construed as limiting the invention.

The precursor (unmodified and unhydrogenated) block copolymers used were the polystyrene-polybutadiene and polystyrene-polyisoprene block copolymers shown in Table 1. Polymers I, II, III, VI, VII and VIII were prepared via sequential anionic polymerization. Polymers IV and V were also prepared via sequential anionic polymerization to produce a living diblock copolymer which was then partially coupled with a difunctional coupling agent, for example an alkyl benzoate. The living ends or portions thereof were then terminated.

The base block copolymers utilized herein were the products of selectively hydrogenating the respective precursor block copolymers. The selective hydrogenation was effected by use of a catalyst comprising the reaction products of an aluminum alkyl compound with nickel carboxylates, specifically triethyl aluminum and nickel octoate. The residual ethylenic unsaturation was determined via ozone titration and was less than 2% of the original ethylenic unsaturation in the poly (conjugated diene) block thereof. The residual aromatic unsaturation of the respective base block copolymer was greater than 98% of the original aromatic unsaturation in the polystyrene block.

The residual ethylenic unsaturation relative to the original ethylenic unsaturation in the poly (conjugated diene) block of the polymer is preferably less than 10% and more preferably less than 5% and most preferably at most 2% to impart enhanced weatherability and impact resistance to the compositions herein. The residual ethylenic unsaturation may be varied by suitably varying the hydrogen pressure and hydrogenation time.

TABLE 1

| | | Precursor Block Copolymer | | | |
|---|---|---|---|---|---|
| Base Block Copolymer | Block Copolymer | Styrene Content (% w) | Block Styrene Content (% w) | Total Mw | Polymer Structure and Block Mw |
| A | I | 29 | 29 | 49,400 | 7,200-35,000-7,200 (S-B-S) |
| B | II | 30 | 30 | 74,900 | 11,200-52,500-11,200 (S-B-S) |
| C | III | 33 | 33 | 181,000 | 29,000-123,000-29,000 (S-B-S) |
| D | IV[1] | 13 | 13 | 83,500 (70%) 41,800 (30%) | 5,300-72,900-5,300 (S-B)$_2$ 5,300-36,500 (S-B) |
| E | V[2] | 31 | 31 | 47,400 (30%) 23,700 (70%) | 7,200-33,000-7,200 (S-B)$_2$ 7,200-16,500 (S-B) |
| F | VI | 29 | 29 | 54,000 | 7,800-38,400-7,800 (S-B-S) |
| G | VII | 29 | 29 | 180,000 | 26,100-127,800-26,100 (S-B-S) |
| H | VIII | 36 | 36 | 95,300 | 36,000-59,300 (S-I) |

1) Polymer is 70% coupled with an alkyl benzoate. The coupled product is referred to as (S-B)$_2$ and the uncoupled polymer is referred to as (S-B).
2) Polymer is 30% coupled with an alkyl benzoate. The coupled product is referred to as (S-B)$_2$ and the uncoupled polymer is referred to as (S-B).

EXAMPLE 1

Modified Block Copolymer—Solution Process

In this example, a modified block copolymer "J" was prepared utilizing the base block copolymer "F". An 11% (wt/wt) solution of the base copolymer "F" (7.8 lbs., see Table 1) in cyclohexane (70 lbs.) was treated, in closed vessel under nitrogen, with maleic anhydride (104.5 gm) and a free radical initiator, benzoyl peroxide (104.5 gm). This solution was heated with stirring from ambient temperature to the boiling point of cyclohexane (81° C.) over a two hour time period. The oil jacket heaters on the 15 gallon stainless steel stirred pressure reactor vessel were then turned off and the vessel contents were allowed to cool to approximately 40° C. Water (1 quart) and antioxidant (10 gm of Ethyl® 330) were then added to the vessel. The resulting mixture was then transferred to a Binks vessel and coagulated by steam stripping.

The level of functionality (% w of maleic anhydride grafted) in the modified block copolymer "J" was measured utilizing colorometric titration with 0.1N methanolic potassium hydroxide and 1% w phenolphthalein in methanol indicator. Prior to colorometric tritration, the modified block copolymer was dried in a vacuum oven at between about 90° C. to 100° C. for 4 hours to remove any remaining unreacted maleic anhydride and to convert any grafted diacid to its anhydride form. Modified block copolymer "J" was found to contain 0.7% w grafted maleic anhydride.

Polymer K was prepared using the procedure described for the preparation of polymer J except that base polymer G was substituted for base polymer F. Polymer K was found to contain 0.5% w grafted maleic anhydride.

Polymer "L" was prepared utilizing the base block copolymer "F". An 11% (wt/wt) solution of the base block copolymer "F" (5.5 lbs., see Table 1) in cyclohexane (50 lbs.) was treated, in a stirred closed vessel under nitrogen, with maleic anhydride (99.88 gm) and a free radical initiator, benzoyl peroxide (99.88 gm). The maleic anhydride and the free radical initiator were each blended with 1 gallon portions of the foregoing solution prior to incorporation into the closed vessel with the remaining solution therein. The solution was heated with stirring from ambient temperature to a final temperature of 180° F (82° C.) which took 24 minutes and held at the final temperature for 3.5 hours. The maximum temperature of the oil in the oil jacket heaters on the 15 gallon stainless steel stirred pressure vessel was set at 220° F (104° C.). At the end of 3.5 hours, the heating was turned off and the vessel contents allowed to cool down to approximately 100° F (approximately 40° C.). Water (1 quart) and antioxidant (7.5 gm of Ethyl® 330) were then added to the vessel. The water was added to hydrolyze any unreacted maleic anhydride to maleic acid. The resulting mixture was then stirred for 30 minutes.

A sample was taken at 4 hours reaction time and coagulated in excess isopropanol in a blender. The sample was dried in a vacuum oven. The polymer "L" was found to contain 0.75% w grafted maleic anhydride utilizing the aforementioned colorometric titration technique.

The material remaining in the reactor vessel was pressured into a Binks vessel with a stainless steel liner. The polymer was coagulated by steam stripping and dried at 180° F (82° C.) for 2 to 3 hours. The steam coagulated material showed 1.6% w bound maleic anhydride. It is believed that the polymer was still "wet"; i.e. in the acid form as opposed to anhydride form, and as such would assay up to two times the actual level of bound maleic anhydride. Thus, half of 1.6% w is 0.8% w which corresponds well with the isopropanol coagulated polymer value of 0.75% w. Therefore, for assaying bound maleic anhydride content, a sample coagulated in excess isopropanol followed by vacuum oven drying is preferred.

EXAMPLE 2

Modified Block Copolymer—Melt Process

In this example, modified block copolymers were prepared utilizing corresponding base block copolymers. These base block copolymers were modified by extruder grafting maleic anhydride thereto in the presence of a free radical initiator (specifically 2,5-dimethyl-2,5-di-(t-butyl peroxy) hexane, Lupersol® 101) in a Haake 30 mm diameter corotating twin screw extruder, unless otherwise indicated.

The reactants were premixed by tumbling in polyethylene bags, and then fed into the extruder. The melt temperature was varied from about 150° C. in the feed zone up to about 280° C. within the extruder with a die temperature of about 260° C. A screw speed of 350 rpm was utilized. The foregoing processing conditions were utilized unless otherwise indicated.

The level of functionality (% w of maleic anhydride grafted) in the respective modified block copolymer was measured utilizing colorometric titration with 0.1N methanolic potassium hydroxide and 1% w phenolphthalein in methanol indicator. Prior to colorometric titration, the soluble fraction of the respective modified block copolymer was extracted by refluxing in tetrahydrofuran and then recovering the soluble fraction by precipitation of the extractant into isopropyl alcohol. This precipitation separated most, if not all, the unbound maleic anhydride from the polymer. The precipitate was dried in a vacuum oven at between about 90° C. and 100° C. for 4 hours to remove any remaining unreacted maleic anhydride and to convert any grafted diacid to its anhydride form, as verified by infrared measurements. The dried precipitate was then analyzed via colorometric titration. Table 2 indicates the reactant concentrations examined, as well as analytical results for the materials prepared.

TABLE 2

| Modified Block Copolymer | Base Block Copolymer | Maleic Anhydride Added (% w) | Peroxide Added (% w) | Maleic Anhydride Grafted Onto THF Solubles (% w)[f] | THF Insolubles (% w) |
|---|---|---|---|---|---|
| M | F | 3 | 0 | 0 | 0 |
| N | F | 3 | 0.01 | 0.2 | 0 |
| P | F | 3 | 0.1 | 1.6 | 2 |
| Q | F | 5 | 0.5 | 4.6 | 2 |
| R | F | 3 | 1.0 | 2.2 | 40 |
| S | F | 3 | 0.1 | 1.6 | — |
| T[a] | F | 3 | 0.1 | 1.2 | — |
| U[b] | A | 3 | 0.25 | 2.2 | — |
| V[c] | A | 3 | 0.25 | 1.8 | — |
| W[d] | A | 1.9 | 0.25 | 1.9 | — |
| X[e] | D | 3 | 0.1 | 2.2 | — |
| Y[g] | A | 2.3 | 0.25 | 2.1 | — |

[a]The extruder utilized was a Werner Pfleiderer 83 mm corotating twin screw extruder (L/D = 15.7) set at 95 rpm with a feed temperature of about 190° C., a melt temperature of about 280° C. and a die temperature of about 270° C.
[b]The extruder utilized was a Werner Pfleiderer 90 mm corotating twin screw extruder set at 350 rpm with a melt temperature (barrel) of about 265° C.
[c]The extruder utilized was a Welding Engineers Inc. (W.E.I.) 2-inch counter-rotating twin screw extruder set at about 350 rpm with a die temperature of about 260° C.
[d]The extruder utilized was a Werner Pfleiderer 133 mm corotating twin screw extruder set at 300 rpm with a melt temperature of 260° C.
[e]The extruder was set at 300 rpm.
[f]Functionality level.
[g]The extruder utilized was a Werner Pfleiderer 90 mm corotating twin screw extruder (L/D = 31) set at 350 rpm with a melt temperature (barrel) of about 300° C. and a die temperature of about 260° C.

Polymer M demonstrates that maleic anhydride could not be grafted to the respective base polymer within the limits of detection of the analytical technique utilized without the addition of a free-radical initiator. Polymer R demonstrates that severe base polymer degradation may occur when, too high a level of free radical initiator is used. The remaining modified polymers in Table 2 illustrate the wide range of functionality levels that may be obtained by the free radical initiated extruder (melt) grafting technique.

EXAMPLE 3

Effect of Different Polyamides on Blend Composition

In this example, the impact strengths and flexural moduli of molded test specimens of various polyamide blends were measured. Herein, at a fixed polyamide to block copolymer ratio of 80:20 and 70:30, the measurements were performed on two different polyamide systems. The polyamides were nylon 6,6 (an $\alpha,\omega$-polyamide, Zytel® 101 from DuPont) and nylon 6 (an $\alpha$-polyamide, Capron® 8200 from Allied-Signal Corporation). Specimens utilizing only the respective polyamide and .blends of the respective polyamide with a base (unmodified) block copolymer were prepared as controls.

Blends of the respective polyamides with either the unmodified or the modified block copolymer were prepared in a Haake 30 diameter corotating twin screw extruder having a 13:1 L/D. The blend components were premixed by tumbling in polyethylene bags and then fed into the extruder.

For nylon 6,6 blends, the extruder melt temperature profile was about 240° C. in the feed zone, about 270° F in the barrel and about 250° C. at the die. A screw speed of 300 rpm was used. The extrudate was pelletized. Injection molded test specimens were made from pelletized extrudate using an Arburg injection molder (Model No. 222-55-250). Injection temperatures and pressures of about 260° C. to about 300° C. and about 800 psig to about 1000 psig, respectively, were employed during the processing operations.

For nylon 6, the extruder melt temperature profile was about 210° C. in the feed zone, about 230° C. in the barrel and about 230° C. at the die. A screw speed of about 300 rpm was used. The extrudate was pelletized. Injection molded test specimens were made from pelletized extrudate using an Arburg injection molder (Model No. 222-55-250). Injection temperatures and pressures of about 250° C. to about 280° C. and about 800 psig to about 1100 psig, respectively, were employed during the processing operations.

As is readily apparent from Table 3, the addition of the modified block copolymer (either S or W) significantly increases the impact strength of the polyamide nylon 6,6. The addition of at least about 20 percent by weight of the modified block copolymer produces a super-tough polyamide (nylon 6,6) blend material. A distinct brittle to ductile failure transition is observed in these nylon 6,6 blends between 10 and 20 percent by weight of the modified block copolymer in the blend composition, whereas no such transition occurs in the nylon 6,6 blends containing the unmodified block copolymer. (05, 06, 07 and 09 vs. 02, 03 and 04).

As is further apparent from Table 3, no such transition occurs in the nylon 6 blends containing either the modified or unmodified block copolymer (11 through 14). The phase size of the nylon 6 blends which incorporate the unmodified block copolymer ranged from about 2 to about 10 µm, whereas the mean phase size of the nylon 6 blends which incorporate the modified block copolymer was about 0.06 µm. The mean phase size of the super-tough nylon 6,6 blends was about 0.2 µm. Though not wishing to be bound to any particular theory, it appears that the reactivity of the nylon 6 in these blends causes too small a phase size to allow super-toughening to occur. Likewise, it appears that the unmodified block copolymers in these nylon 6 blends causes too large a phase size to allow super-toughening to occur.

TABLE 3

| Sample | Polyamide | Block Copolymer | Block Copolymer (% w)[d] | Functionality (% w)[e] | Flexural Modulus (Kpsi) | ⅛" Dry as Molded Notched Izod Impact Toughness (ft.-lb./in.) RT[b] | -20° F. | -40° F. | Mean Phase Size (µm) |
|---|---|---|---|---|---|---|---|---|---|
| 01 | Nylon 6,6 | — | 0 | — | 439 | 0.8 | 0.7 | — | — |
| 02 | Nylon 6,6 | F | 10 | — | — | 1.3 | — | — | — |
| 03 | Nylon 6,6 | F | 20 | — | — | 1.3 | — | — | — |
| 04 | Nylon 6,6 | F | 30 | — | — | 1.5 | — | — | — |
| 05 | Nylon 6,6 | S | 10 | 1.6 | 409 | 3.3 | 1.2 | — | — |
| 06 | Nylon 6,6 | S | 20 | 1.6 | 294 | 19.8[a] | 3.5 | — | .2 (approx.) |
| 07 | Nylon 6,6 | S | 30 | 1.6 | 224 | 22.9[a] | 12.4/ 17.2[a,c] | — | — |
| 08 | Nylon 6,6 | — | 0 | — | 400 | 0.8 | — | 0.8 | — |
| 09 | Nylon 6,6 | U | 20 | 2.2 | 280 | 19.8[a] | — | 2.5 | .2 (approx.) |
| 10 | Nylon 6 | — | 0 | — | 371 | 1.2 | 0.8 | — | — |
| 11 | Nylon 6 | A | 20 | — | 239 | 2.4 | — | — | 2-10 |
| 12 | Nylon 6 | A | 30 | — | 244 | 3.0 | 1.5 | — | — |
| 13 | Nylon 6 | U | 20 | 2.2 | 239 | 3.2 | 1.5 | — | .06 (approx.) |
| 14 | Nylon 6 | U | 30 | 2.2 | 217 | 3.9 | 1.5 | — | — |

[a]Ductile failure.
[b]Room Temperature (23° C).
[c]Above the veriule (/) is the gate test specimen result and below the veriule is the dead end test specimen result. The veriule is utilized when the gate and dead end test specimens give significantly different results. Otherwise, the two values are averaged.
[d]Based on the blend composition, i.e., the polyamide plus block copolymers.
[e]Based on the respective base block copolymer.

EXAMPLE 4

Effects of Residual Ethylenic Unsaturation in the Base Block Copolymer on Blend Composition In this example, the two precursor block copolymers I and II, shown in Table 1, were utilized to prepare the base block copolymers shown in Table 4 having a variety of residual ethylenic unsaturation (RU), i.e., the ethylenic unsaturation in the poly (conjugated diene) block remaining after hydrogenation relative to the original ethylenic unsaturation therein. The base block copolymers were the products of selectively hydrogenating the respective precursor block copolymers to various RU's effected by use of a catalyst comprising the reaction products of an aluminum alkyl compound (specifically triethyl aluminum) with a nickel carboxylate (specifically nickel octoate) by suitably varying the hydrogen pressure and hydrogenation time. The residual unsaturation in the respective base block copolymer was determined by ozone titration.

These base block copolymers were thereafter modified by extruder grafting maleic anhydride thereto in the presence of a free radical initiator (specifically 2,5-dimethyl-2,5-di(t-butyl peroxy)hexane; LUPERSOL® 101) per the method of Example 2. The level of functionality (% w of maleic anhydride grafted) in the modified block copolymer was measured utilizing colorometric titration per the method of Example 2. These modified block copolymers are also shown in Table 4.

These modified block copolymers were then combined with an α,ω-polyamide (nylon 6,6; ZYTEL® 101 from DuPont) in a weight ratio of 80:20 polyamide to modified block copolymer. These two materials were combined by means of a corotating twin screw extruder per the method of Example 3 for nylon 6,6 blend compositions.

The extruder utilized for both grafting and nylon blending was a Werner Pfleiderer 90 mm corotating twin screw extruder.

The obtained compositions (samples 15 through 25) were subjected to injection molding to obtain a test piece formed close to the mold gate and another test piece formed at the dead end of the mold for each composition. With respect to each of the test pieces, impact strength was evaluated utilizing ASTM D-256 ⅛-inch notched Izod (ft-lb/in) at room temperature (23° C.). Morphological studies were also carried out on samples 16–18 and 21–23 and 25 by electron micrograph examination of ruthenium tetroxide stained samples cut from injection molded bars perpendicular to the flow direction. Flexural moduli of samples 20-25 were also measured according to ASTM D-790.

These results are tabulated in Table 5. The data relating to RU and ⅛-inch notched Izod at room temperature is plotted in FIG. 1.

As indicated in Table 4, the RU of the base block copolymer has a direct effect on the amount of degradation thereof and the formation of coupled polymer yielding a high molecular weight (HMWT) polymer during functionalization (maleation) thereof. The RU is preferably less than about 10%, more preferably less than about 5%, to minimize degradation and high molecular weight polymer formation during the functionalization step.

As indicated in Table 5 and FIG. 1, the RU of the base block copolymer also has a surprising and unexpected direct effect on the impact strength of articles (test specimens) formed from the respective blend compositions. Between about 20% and about 10% RU, the impact strength of the blend composition undergoes a failure mechanism transition; i.e., from brittle failure to ductile failure, provided sufficient shear is utilized during the blending operation to obtain an effective phase size of the modified block copolymer within the α,ω-polyamide to yield a super-toughened composition. At less than about 10% RU, the impact strength of these compositions remains relatively constant (at about 20 ft-lb/in. for these blend compositions).

TABLE 4

| Modified Block Copoly-mer | Pre-cursor Block Copoly-mer | Base Block Copoly-mer[a] % R.U. | Modified Block Copolymer | | |
|---|---|---|---|---|---|
| | | | % w MA-grafted | % Degrada-tion[b] | % HMWT Polymer[c] |
| Z  | I  | 12.7 | 2.0 | 59   | 30.2[d] |
| AA | I  | 8.6  | 0.9 | 51   | 39.2 |
| BB | I  | 1.1  | 0.6 | 14   | — |
| CC | I  | 0.7  | 1.3 | 15   | 8.2 |
| DD | I  | 0.7  | 0.9 | 16   | 8.3 |
| EE | II | 19.5 | 1.0 | 61.0 | 5.6[d] |
| FF | II | 15.0 | 1.1 | 62.9 | 23.2[d] |
| GG | II | 9.2  | 1.0 | 63.1 | 34.5[d] |
| HH | II | 5.5  | 0.9 | 46.6 | 5.0 |
| JJ | II | 1.3  | 0.9 | 29.1 | 12.0 |
| KK | II | 0.2  | 0.9 | 24.2 | 9.3 |

[a]Residual unsaturation left in B block after hydrogenation of precursor block copolymer resulting in the corresponding base block copolymer. Determined by ozone titration. Little or no hydrogenation of polystyrene block.
[b]The percent loss of the polystyrene-poly(ethylene/butylene)-polystyrene peak in the GPC UV-trace. The hydrogenated poly(butadiene) block is referred to as poly(ethylene/butylene).
[c]The amount of high molecular weight polymer in GPC UV-trace. This polymer is the product of coupling of the precursor polymer.
[d]Note that at high % HMWT polymer (>50% degradation) the portion of this material corresponding to very high molecular weight polymer is filtered out to avoid plugging up GPC columns. Thus, % HMWT polymer is actually higher at % degradation >50% than reported.

TABLE 5

| | Modified Block Copolymer | | | Blends[a] | | | |
|---|---|---|---|---|---|---|---|
| | | | | ⅛" Notched Izod at R.T.[b] | Phase Size (μm)[g] | | Flexural Modulus[e] |
| Sample | Polymer | % R.U.[c] | (% w) MA grafted[d] | (ft-lb/in) | Range | Average | (Kpsi) |
| 15 | Z  | 12.7 | 2.0 | 17.7/16.3[f] | 0.1–1.0 | 0.2 | — |
| 16 | AA | 8.6  | 0.9 | 19.1/20.9[f] | —       | —   | — |
| 17 | BB | 1.1  | 0.6 | 20.6/20.4[f] | 0.1–0.7 | 0.3 | — |
| 18 | CC | 0.7  | 1.3 | 20.0/18.9[f] | 0.1–0.5[h] | 0.2[h] | — |
| 19 | DD | 0.7  | 0.9 | 22.6/24.1[f] | —       | —   | — |
| 20 | EE | 19.5 | 1.0 | 3.0/4.0      | 0.1–5.0 | 0.3 | 257 |
| 21 | FF | 15.0 | 1.1 | 13.3/17.8[f] | 0.2–1.5 | 0.3 | 258 |
| 22 | GG | 9.2  | 1.0 | 19.8/19.5[f] | 0.1–0.7 | 0.2 | 240 |
| 23 | HH | 5.5  | 0.9 | 19.9/19.9[f] | 0.1–0.7 | 0.2 | 239 |
| 24 | JJ | 1.3  | 0.9 | 19.5/19.3[f] | 0.1–0.4 | 0.2 | 231 |
| 25 | KK | 0.2  | 0.9 | 18.1/18.4[f] | 0.1–0.4 | 0.2 | 241 |

TABLE 5-continued

|  | Modified Block Copolymer | | Blends[a] | | | |
|---|---|---|---|---|---|---|
| | | | ⅛" Notched Izod at R.T.[b] | Phase Size (μm)[g] | | Flexural Modulus[c] |
| Sample | Polymer | % R.U.[e] | (% w) MA grafted[d] | (ft-lb/in | Range | Average | (Kpsi) |

[a]All blends were formulated with 80% w polyamide (nylon 6,6; Zytel® 101 from DuPont) and 20% w block copolymer.
[b]Room temperature ⅛" notched Izod per ASTM D-256. See FIG. 1 for plot of notched Izod v. % R.U. Above veriule (/) is the gate test specimen result and below the veriule is the dead end test specimen.
[c]ASTM D-790
[d]Determined by colorometric titration. MA stands for maleic anhydride.
[e]Residual ethylenic unsaturation of corresponding base block copolymer present therein prior to functionalization (modification).
[f]Ductile failure.
[g]These values were determined from STEM's of the blend test specimens.
[h]These particles were difficult to measure since they are in clusters and are not very well defined.

EXAMPLE 5

Effect of Functionality Level of the Block Copolymer on the Blend Composition In the example, the impact strength and flexural moduli of various α,ω-polyamide blends were measured while varying the functionality level (i.e., % w grafted maleic anhydride) of the modified block copolymer contained therein. The weight ratio of polyamide to block copolymer was held constant at 80:20. Base block copolymer utilized were all less than 10% RU. The results are tabulated in Table 6 and depicted in FIG. 2.

Figure 2:
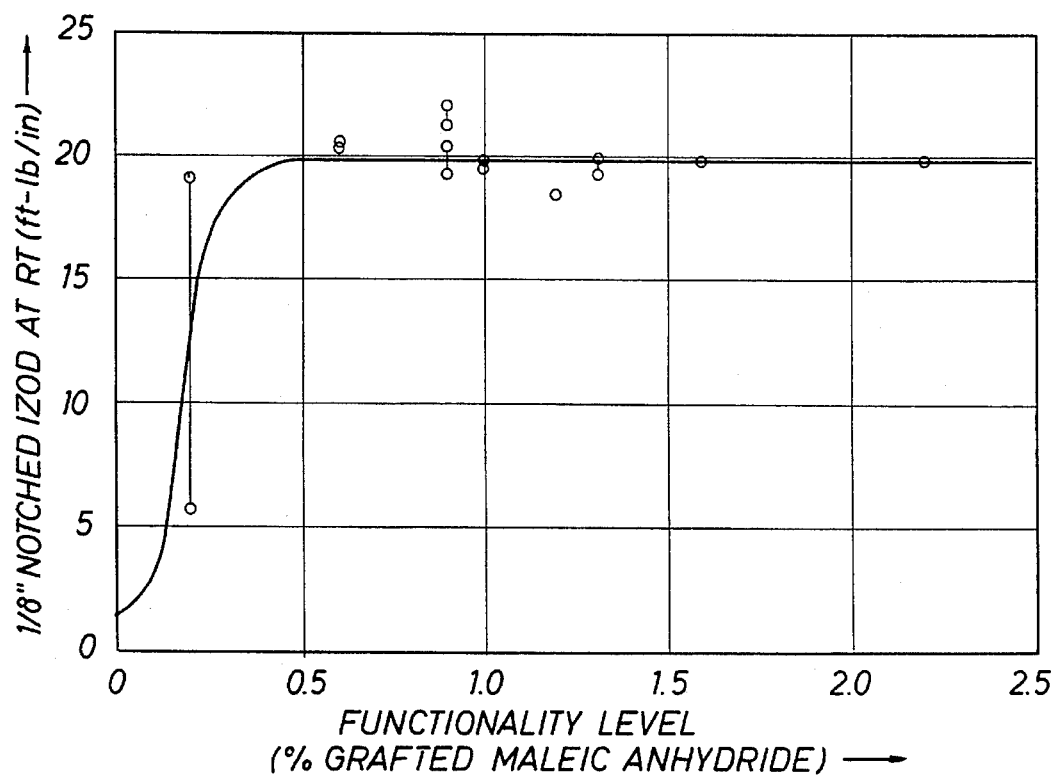
FIG. 2 is a x-y plot of ⅛ inch notched Izod at Room Temperature (ft-lb/in) versus Functionality Level (% w grafted maleic anhydride).

As is readily apparent from Table 6 and FIG. 2, the blend compositions undergo a transition from brittle failure to ductile failure at a functionality level between 0% w and 0.6% w. At functionality levels of greater than 0.2% w, preferably at least about 0.5% w, the blend compositions possess super-tough properties. At functionality levels of at least about 0.5% w, the impact strength of these compositions remain relatively constant and super-tough.

However, Samples 28 and 29 which utilize the solution maleated polymer K indicate that there is a distinction between the solution maleated polymers and the melt process solvent-free (extruder) maleated polymers in their abilities to impact modify the α,107-polyamides. However, the distinction appears and is believed to lie in the block copolymer content of the composition and that the foregoing limits for functionality levels still hold for the solution maleated polymers as well, once an effective amount of modified block copolymer is utilized.

TABLE 6

| | | Modified Block Copolymer | | | Flexural Modulus | ⅛" Dry as Molded Notched Izod Impact Toughness | | |
|---|---|---|---|---|---|---|---|---|
| | | | Content | Functionality | | (ft.-lb/in.) | | |
| Sample | Polyamide | Block Copolymer | (% w)[a] | (% w)[b] | (Kpsi) | RT[c] | −20° F. | −40° F. |
| 03 | Nylon 6,6 | F | 20 | 0 | — | 1.3 | — | — |
| 16 | " | AA | 20 | 0.9 | — | 19.1/20.9[d] | — | — |
| 17 | " | BB | 20 | 0.6 | — | 20.6/20.4[d] | — | — |
| 18 | " | CC | 20 | 1.3 | — | 20.0/18.9[d] | — | — |
| 19 | " | DD | 20 | 0.9 | — | 22.6/24.1[d] | — | — |
| 22 | " | GG | 20 | 1.0 | 240 | 19.8/19.5[d] | — | — |
| 23 | " | HH | 20 | 0.9 | 239 | 19.9/19.9[d] | — | — |
| 25 | " | KK | 20 | 0.9 | 241 | 18.1/18.4[d] | — | — |
| 26 | " | T | 20 | 1.2 | 297 | 17.7[d] | 2.4 | 2.0 |
| 06 | " | S | 20 | 1.6 | 294 | 19.8[d] | 3.5 | — |
| 09 | " | U | 20 | 2.2 | 280 | 19.8[d] | — | 2.5 |
| 27 | " | N | 20 | 0.2 | — | 6.3/18.4[e] | — | — |
| 28 | " | L | 20 | 0.75 | 322 | 4.4 | 1.9 | 1.7 |
| 29 | " | L | 25 | 0.75 | 275 | 20.4[d] | 2.6 | 2.0 |

[a]Remainder of blend was the indicated polyamide.
[b]Grafted maleic anhydride. Determined by colorometric titration.
[c]ASTM D-790.
[d]Ductile failure.
[e]Only dead end test specimen was super-tough.

EXAMPLE 6

Effect of Modified Block Copolymer Content and Type on the Blend Composition In this example, the impact strengths and flexural moduli of various α,107-polyamide blends were measured while varying the total modified block copolymer content thereof. The modified block copolymers utilized were polymer T, an extruder functionalized polymer, and polymer L, a solution functionalized polymer. The α,ω-polyamide utilized was a nylon 6,6 (ZYTEL® 101). With respect to polymer T, the modified block copolymer content of these compositions was varied from 0% w up to 35% w in 5% w increments, where % w is based on the combined weights of the α,ω-polyamide and modified block copolymer therein. These results are tabulated in Table 7 and depicted in FIG. 3. With respect to polymer L, the modified block copolymer content was varied from 20% w to 35% w in 5% w increments. These results are tabulated in Table 8 and depicted in FIG. 4.

Figure 3:
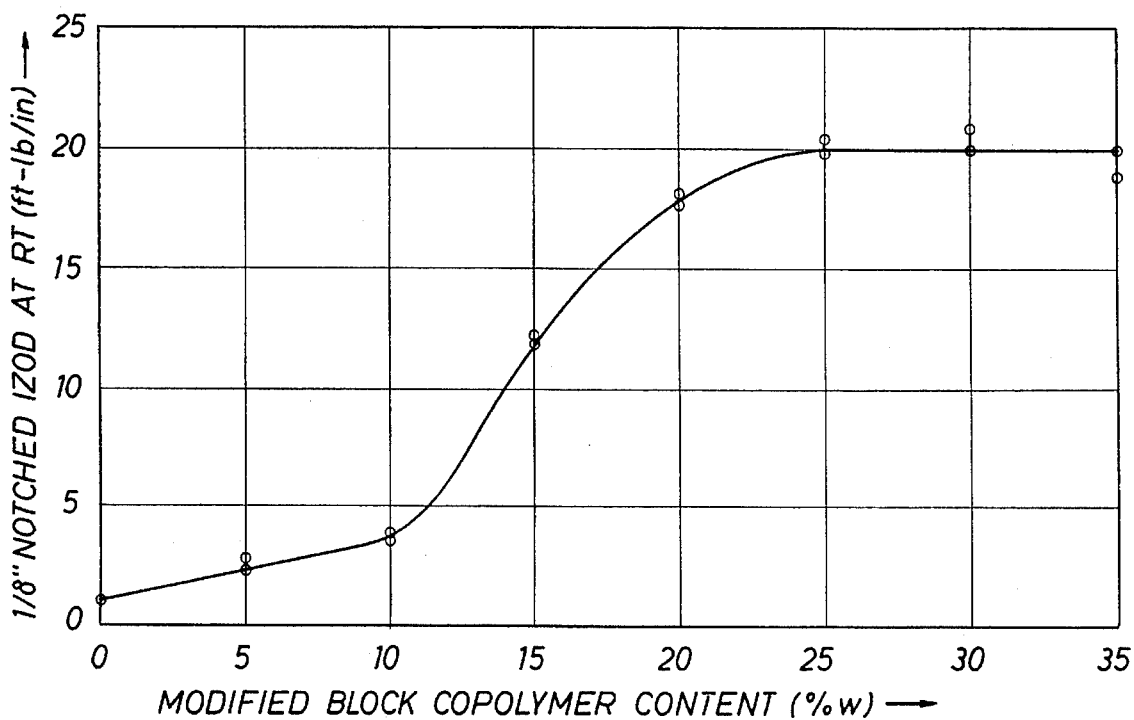
FIG. 3 is an x-y plot of ⅛ inch notched Izod at Room Temperature (ft-lb/in) versus Modified Block Copolymer Content (% w).

As is readily apparent from Table 7 and FIG. 3, the blend compositions undergo a brittle to ductile failure mechanism transition between modified block copolymer contents of 10% w and 20% w. The modified block copolymer content is about 14% w at the transition point. Thus, at least when extruder functionalized polymers are utilized, the modified block copolymer content, which is effective in super-toughening the blend compositions, is at least about 15% w (which includes 14% w) to less than about 50% w and preferably from about 15% w to about 40% w.

Figure 4:
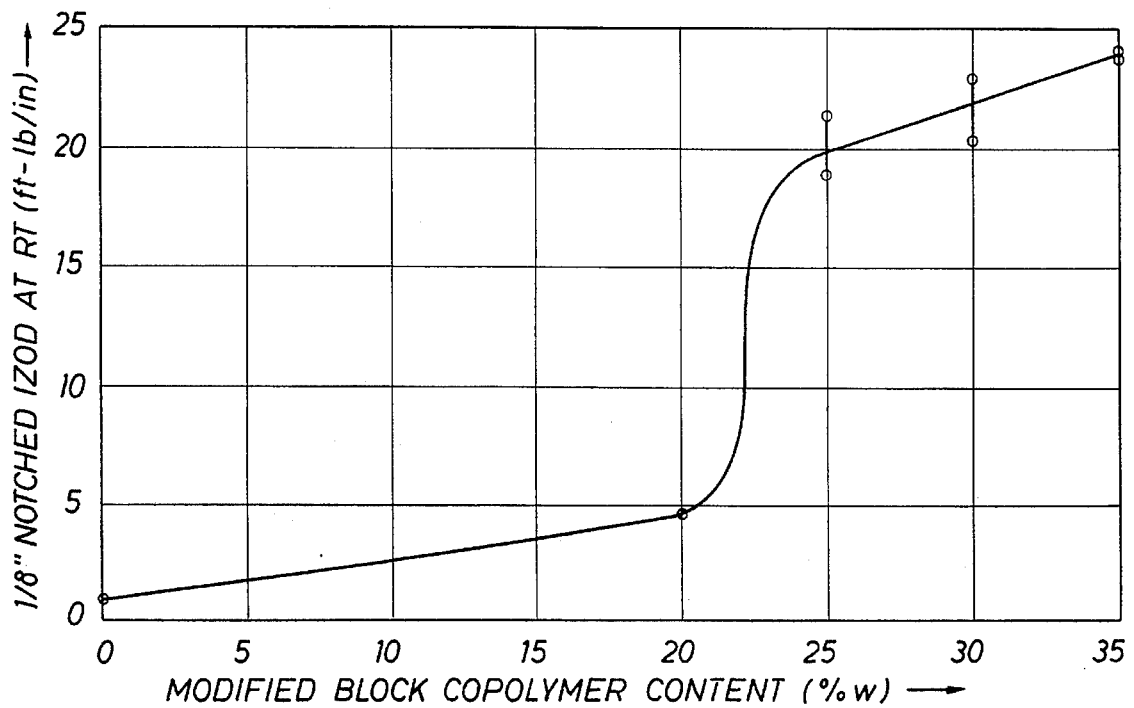
FIG. 4 is an x-y plot of ⅛ inch notched Izod at Room Temperature (ft-lb/in) versus Modified Block Copolymer Content (% w).

As is further readily apparent from Table 8 and FIG. 4, the blend compositions utilizing a solution functionalized polymer undergo a brittle to ductile failure mechanism transition between modified block copolymer contents of 20% w and 25% w. The modified block copolymer content is about 22.5% w at the transition point. Thus, when solution functionalized polymers are utilized, the modified block copolymer content which is effective in super-toughening the blend compositions is at least about 25% w (which includes 22.5% w) to less than about 50% w and preferably from about 25% w to about 40% w.

Thus, as noted in Example 5, there is an apparent distinction between the solution maleated (functionalized) polymers and the extruder maleated (functionalized) polymers in their abilities to impact modify the α,ω-polyamide. This distinction is related to the amount of the respective block copolymer which is effective in super-toughening the blend composition. However, there is a common thread connecting these modified block copolymers in that the modified block copolymers are the reaction product of a base block copolymer, an α,β-ethylenically unsaturated dicarboxylic acid or cyclic anhydride thereof and a free radical initiator, plus there does exist an effective amount of modified block copolymer for super-toughening α,ω-polyamide blend compositions provided the modified block copolymer has a minimum level of functionality, i.e., greater than about 0.2% w of the succinic group, e.g. grafted maleic acid or cyclic anhydride thereof.

TABLE 7

| | | Modified Block Copolymer | | | | Blend | | | |
| | | | | | | Flexural | ⅛" Dry as Molded Notched Izod Impact Toughness | | |
| | | Block | Content | Functionality | Run | Modulus | (ft.-lb./in.) | | |
| Sample | Polyamide | Copolymer | (% w) | (% w) | No. | (Kpsi) | RT | −20° F. | −40° F. |
|---|---|---|---|---|---|---|---|---|---|
| 30 | Nylon 6,6 | T | 5 | 1.2 | I | 404 | 2.5 | 0.8/0.9 | 0.7/0.8 |
| 31 | " | T | 5 | 1.2 | II | 441 | 2.1 | 0.7/0.9 | 0.8/0.8 |
| 32 | " | T | 5 | 1.2 | III | 424 | 2.0 | 0.7/0.9 | 0.8/0.8 |
| 33 | Nylon 6,6 | T | 10 | 1.2 | I | 376 | 3.6 | 1.3/1.3 | 1.2/1.3 |
| 34 | " | T | 10 | 1.2 | II | 390 | 3.8 | 1.5/1.5 | 1.1/1.0 |
| 35 | " | T | 10 | 1.2 | III | 382 | 3.5 | 1.3/1.3 | 0.9/1.2 |
| 36 | Nylon 6,6 | T | 15 | 1.2 | I | 340 | 11.9[a] | 1.7/1.8 | 1.5/1.6 |
| 37 | " | T | 15 | 1.2 | II | 353 | 11.8[a] | 1.8/1.8 | 1.6/1.8 |
| 38 | " | T | 15 | 1.2 | III | 340 | 12.0[a] | 1.6/1.8 | 1.4/1.5 |
| 39 | Nylon 6,6 | T | 20 | 1.2 | I | 292 | 18.0[a] | 2.1/2.5 | 2.0/2.1 |
| 40 | " | T | 20 | 1.2 | II | 303 | 17.5[a] | 2.5/2.6 | 1.9/2.2 |
| 41 | " | T | 20 | 1.2 | III | 296 | 17.5[a] | 2.2/2.4 | 1.8/1.8 |
| 42 | Nylon 6,6 | T | 25 | 1.2 | I | 261 | 19.8[a] | 3.2/4.4 | 2.4/2.8 |
| 43 | " | T | 25 | 1.2 | II | 289 | 20.5[a] | 3.8/12.2[b] | 2.8/3.1 |
| 44 | " | T | 25 | 1.2 | III | 283 | 20.0[a] | 3.7/4.4 | 2.4/2.6 |
| 45 | Nylon 6,6 | T | 30 | 1.2 | I | 248 | 20.0[a] | 9.7/10.1[a] | 3.1/3.7 |
| 46 | " | T | 30 | 1.2 | II | 242 | 21.1[a] | 14.7/14.9[a] | 3.4/3.4 |
| 47 | " | T | 30 | 1.2 | III | 240 | 20.6[a] | 7.5/8.9[a] | 2.7/2.7 |
| 48 | Nylon 6,6 | T | 35 | 1.2 | I | 209 | 18.8[a] | 14.5/15.1[a] | 4.0/4.1 |
| 49 | " | T | 35 | 1.2 | II | 219 | 20.0[a] | 15.7/16.6[a] | 4.8/7.0 |
| 50 | " | T | 35 | 1.2 | III | 216 | 19.4[a] | 15.1/15.9[a] | 3.8/6.3 |

[a]Ductile failure.
[b]Only dead end test specimens was super-tough.

TABLE 8

| Sample | Polyamide | Modified Block Copolymer Block Copolymer | Content (% w) | Functionality (% w) | Blend Run No. | Flexural Modulus (Kpsi) | 1/8" Dry as Molded Notched Izod Impact Toughness (ft.-lb./in.) RT | −20° F. | −40° F. |
|---|---|---|---|---|---|---|---|---|---|
| 51 | Nylon 6,6 | L | 20 | 0.75 | I | 329 | 4.5 | 1.8/2.1 | 1.6/1.6 |
| 52 | " | L | 20 | 0.75 | II | 315 | 4.4 | 1.8/1.8 | 1.8/1.8 |
| 53 | Nylon 6,6 | L | 25 | 0.75 | I | 281 | 19.1[a] | 2.2/2.6 | 1.9/2.0 |
| 54 | " | L | 25 | 0.75 | II | 270 | 21.7[a] | 2.7/3.1 | 2.0/2.3 |
| 55 | Nylon 6,6 | L | 30 | 0.75 | I | 243 | 20.7[a] | 2.5/2.5 | 1.9/2.0 |
| 56 | " | L | 30 | 0.75 | II | 236 | 23.3[a] | 2.8/3.3 | 2.0/2.3 |
| 57 | Nylon 6,6 | L | 35 | 0.75 | I | 227 | 24.2[a] | 3.5/3.9 | 3.0/3.4 |
| 58 | " | L | 35 | 0.75 | II | 206 | 24.0[a] | 3.2/3.7 | 2.6/2.7 |

[a]Ductile failure.

EXAMPLE 7

Effect of Substituting a Portion of Modified Block Copolymer with Unmodified Block Copolymer In this example, the impact strengths and flexural moduli of molded test specimens of various polyamide blends and phase size of the block copolymer portion therein were measured. Herein, at a fixed polyamide to total block copolymer ratio of 80:20, the measurements were performed on two polyamide systems wherein the effect of varying the relative proportion of unmodified block copolymer to modified block copolymer is shown. The polyamides were nylon 6,6 (an α,ω-polyamide, ZYTEL® 101) and nylon 6 (an α-polyamide, CAPRON® 8200). The blends were prepared according to the procedures of Example 3 herein.

As is readily apparent from Table 9, the substitution of the modified block copolymer (S) for the unmodified block copolymer (F) significantly increases the impact strength of the polyamide, nylon 6,6. (Sample 06 vs. 03). By substituting a portion of the modified block copolymer (S) with the unmodified block copolymer (F), the blends eventually lose their super-tough characteristics (see samples 16 and 17). A like effect is observed when a portion of the modified block copolymer (U) is substituted with the unmodified block copolymer (C) (see samples 09, 61 and 62). The super-tough blends were observed to have a mean block copolymer phase size of approximately 0.2 μm (see samples 06 and 09).

However, a surprising effect is observed with α-polyamide, e.g. nylon 6. Blends of nylon 6 with either the unmodified block copolymer (A or C) (samples 11 and 63) or the modified block copolymer (U) (samples 13 and 64) have low impact strengths relative to blends of nylon 6, a modified block copolymer (U or W) and an unmodified block copolymer (C) (samples 65 to 68), which are super-tough. The nylon 6/unmodified block copolymer blends were observed to have phase sizes of 2-10 μm. The nylon 6/modified block copolymer blends were observed to have a mean phase size of approximately 0.06 μm. The ternary blends of α-polyamide, modified block copolymer and unmodified block copolymers were observed to have an intermediate phase size, e.g. 0.4 μm.

Though not wishing to be bound to any particular theory, it appears that an effective phase size for super-toughening these blends is required. From the data, it appears that a phase size of 2–10 μm is too large and a phase size for the block copolymer portion of 0.06 μm is too small for super-toughening. Thus, an effective mean phase size for super-toughening is intermediate of these two extremes; i.e. greater than 0.06 μm and less than 2 μm. This effective mean phase size for the block copolymer containing portion is preferably from about 0.1 μm to about 1 μm, more preferably, from about 0.2 μm to about 0.8 μm for α-polyamide blends and from about 0.1 μm to about 0.5 μm for α,ω-polyamide blend. It also appears then the relative proportion of the unmodified block copolymer to modified block copolymer in these blends may at-least range from about 7:13 (35:65) to about 17:3 (85:15) for blends utilizing α-polyamide and from about 0:100 to about 75:25 (See FIG. 5) for blends utilizing α,ω-polyamide.

TABLE 9

| Sample | Polyamide | Total Block Copolymer Content (% w)[c] | Unmodified Block Copolymer Block Copoly-mer | Content (% w)[c] | Modified Block Copolymer Block Copoly-mer | Content (% w)[c] | Function-ality (% w)[d] | Flexural Modulus (Kpsi) | 1/8" Dry as Molded Notched Izod Impact Toughness (ft.-lb./in.) RT[b] | −20° F. | −40.° F. | Mean Phase Size (μm) |
|---|---|---|---|---|---|---|---|---|---|---|---|---|
| 03 | Nylon 6,6 | 20 | F | 20 | — | — | — | — | 1.3 | — | — | — |
| 06 | Nylon 6,6 | 20 | — | — | S | 20 | 1.6 | 294 | 19.8[a] | 3.5 | — | 0.2 (approx.) |
| 59 | Nylon 6,6 | 20 | F | 10 | S | 10 | 1.6 | — | 22.9 | — | — | — |
| 60 | Nylon 6,6 | 20 | F | 18 | S | 2 | 1.6 | — | 3.5 | — | — | — |
| 09 | Nylon 6,6 | 20 | — | — | U | 20 | 2.2 | 280 | 19.8[a] | — | 2.5 | 0.2 (approx.) |

TABLE 9-continued

| | | Total Block Copolymer | Unmodified Block Copolymer | | Modified Block Copolymer | | Flexural | ⅛" Dry as Molded Notched Izod Impact Toughness (ft.-lb./in.) | | | Mean |
|---|---|---|---|---|---|---|---|---|---|---|---|
| | | | Block | | Block | | Function- | Modulus | | −20° | −40.° | Phase |
| Sam- | | Content | Copoly- | Content | Copoly- | Content | ality | | | F. | F. | Size |
| ple | Polyamide | (% w)$^c$ | mer | (% w)$^c$ | mer | (% w)$^c$ | (% w)$^d$ | (Kpsi) | RT$^b$ | | | (μm) |
| 61 | Nylon 6,6 | 20 | C | 10 | U | 10 | 2.2 | 276 | 18.9$^a$ | — | 3.1 | — |
| 62 | Nylon 6,6 | 20 | C | 16 | U | 4 | 2.2 | — | 4.7 | — | — | — |
| 11 | Nylon 6 | 20 | A | 20 | — | — | — | 239 | 2.4 | — | — | 2–10 |
| 63 | Nylon 6 | 20 | C | 20 | — | — | — | 258 | 2.2 | — | — | — |
| 13 | Nylon 6 | 20 | — | — | U | 20 | 2.2 | 239 | 3.2 | 1.5 | — | 0.06 (approx.) |
| 64 | Nylon 6 | 20 | — | — | U | 20 | 2.2 | 206 | 4.0 | — | — | — |
| 65 | Nylon 6 | 20 | C | 7 | U | 13 | 2.2 | 211 | 19.9$^a$ | — | 2.0 | 0.4 (approx.) |
| 66 | Nylon 6 | 20 | C | 13 | U | 7 | 2.2 | 199 | 23.6$^a$ | — | 2.1 | 0.6 (approx.) |
| 67 | Nylon 6 | 20 | C | 17 | U | 3 | 2.2 | 212 | 22.9$^a$ | — | 2.0 | 0.7 (approx.) |
| 68 | Nylon 6 | 20 | C | 13 | W | 7 | 1.9 | — | 21.0$^a$ | — | — | — |

$^a$Ductile failure.
$^b$Room Temperature (23° C.).
$^c$Based on the blend composition, i.e., the polyamide plus the block copolymers.
$^d$Based on the respective base block copolymer.

EXAMPLE 8

Effect of Utilizing Color Concentrates

In this example, the impact strengths and flexural moduli of molded test specimens of various polyamide blends with and without Color concentrates were measured. Herein, a fixed polyamide to total block copolymer ratio of about 80:20 by weight was utilized.

The blends were prepared according to the procedures of Example 3 herein, except that these samples utilized a Werner-Pfleiderer (WP) 30 mm, 30:1 L/D ZSK corotating twin-screw extruder and an Engel injection molder Model No. ES-125 having a maximum clamp force of 140 tons and a 3.59 ounce barrel volume maximum. The extruder melt temperature profile for the WP extruder was about 235° C. in the feed zone, about 155° C. in the barrel and about 240° C. at the die with a melt temperature of about 260° C. A screw speed of about 300 rpm was also used.

As is readily apparent from Table 10, super-toughened blend properties are maintained regardless of the presence or absence of commercially acceptable levels of color concentrates in the blend compositions embodying the present invention (sample 69 is a control). Additionally, the test specimens demonstrated no appreciable effect on the impact properties or flexural moduli with respect to the type of colorant. The blends were prepared according to the procedures of Example 7 for samples 25 and 30 through 37, except the screw speed for sample 47 was 430 rpm and the screw speed for samples 48 through 51 was 395 rpm.

TABLE 10

| | | Total Block Copolymer | Modified Block Copolymer | | | Color Concentrate | | Flexural | Inj. Molder Back | Room Temperature ⅛" Dry as Molded |
|---|---|---|---|---|---|---|---|---|---|---|
| | | Content | Block | Content | Function- ality | | Content | Modulus | Pressure | Impact Toughness |
| Sam- ple$^i$ | Polyamide | (% w)$^f$ | Copolymer | (% w)$^f$ | (% w)$^g$ | Color | (phb)$^h$ | (Kpsi) | (psig) | (ft-lb/in)$^{i,j}$ |
| 69 | Nylon 6,6 | 0 | — | — | — | — | — | 451 | — | 0.4 |
| 70 | Nylon 6,6 | 20 | U | 20 | 1.9 | — | 0 | 290 | — | 16.4/15.1$^a$ |
| 71 | Nylon 6,6 | 20.7 | U | 20.7 | 1.9 | Red$^b$ | 4 | 286 | — | 17.6/16.6$^a$ |
| 72 | Nylon 6,6 | 20.7 | U | 20.7 | 1.9 | Black$^c$ | 4 | 288 | — | 17.7/16.7$^a$ |
| 73 | Nylon 6,6 | 20.7 | U | 20.7 | 1.9 | Yellow$^d$ | 4 | 293 | — | 16.7/16.3$^a$ |

$^a$Ductile failure.
$^b$Red color concentrate CNY00306 from Reed Plastics Corporation, Holden, Ma. (Reed).
$^c$Black color concentrate CNY04892 from Reed.
$^d$Yellow color concentrate CNY00925 from Reed.
$^e$White color concentrate CNY02655 from Reed.
$^f$Based on the composition, i.e., polyamide plus block copolymers.
$^g$Based on the respective base block copolymer.
$^h$Part per hundred of the blend composition, i.e., polyamide plus block copolymers.
$^i$Room temperature (23° C.).
$^j$See note b of Table 6.

EXAMPLE 10

Effect of Regrinding the Blend Composition

In this example, the impact strengths of molded test specimens of a polyamide blend composition which were reground a predetermined number of times were measured. The test specimen which was not reground was utilized as a point of reference. The blends were prepared according to the procedure of Example 8 with regrinding as an additional step where indicated. During a regrind, the molded specimens were pelletized and remolded per regrind.

As is readily apparent from Table 11, impact properties were affected by regrinding; however, super-tough properties were nonetheless maintained. A single regrind had the most detrimental effect. However, additional regrinds did further enhance the impact characteristics of the first regrind material. In regards to super-tough properties, the morphology of these blend compositions once established is quite stable and allows for the utilization or recycling of scrap materials of these blends.

TABLE 11

| Sample | Polyamide | Total Block Copolymer Content (% w)[e] | Modified Block Copolymer Block Copoly-mer | Modified Block Copolymer Content (% w)[e] | Modified Block Copolymer Function-ality (% w)[f] | Number of Regrinds[d] | Flexural Modulus[g] (Kpsi) | Tensile Strength[h] (psi) | % Elonga-tion at Break[h] | ⅛" Dry as Molded Notched Izod Impact Toughness (ft.-lb./in.) RT | ⅛" Dry as Molded Notched Izod Impact Toughness (ft.-lb./in.) −20° F. |
|---|---|---|---|---|---|---|---|---|---|---|---|
| 58 | Nylon 6,6 | 20 | Y | 20 | 2.0 | 0 | 338 | 7139 | 39 | 15.3/15.9[a] | 2.4/2.8 |
| 59 | Nylon 6,6 | 20 | Y | 20 | 2.0 | 1 | 297 | 6815 | 34 | 9.7/10.4[a] | 2.5/2.8 |
| 60 | Nylon 6,6 | 20 | Y | 20 | 2.0 | 3 | 287 | 6712 | 41 | 11.9/12.6[a] | 2.3/2.8 |

[a]Ductile failure.
[b]Above the veriule (/) is the gate test specimen result and below the veriule is the dead end test specimen.
[c]Room temperature (23° C.).
[d]The molded material is pelletized and remolded per regrind.
[e]Based on the blend composition, i.e., the polyamide plus the block copolymers.
[f]Based on the respective base block copolymer.
[g]ASTM D-790
[h]ASTM D-638

While the present invention has been described and illustrated by reference to particular embodiments thereof, it will be appreciated by those of ordinary skill in the art that the same lends itself to variations not necessarily illustrated herein. For this reason, then, reference should be made solely to the appended claims for purposes of determining the true scope of the present invention.

What is claimed is:

1. A polymer composition, comprising:

from 70% to 80% by weight of a thermoplastic polyamide which is a nylon 6,6 polyamide having a number average molecular weight of at least 5,000;

from 20% to 30% by weight of a styrene-hydrogenated butadiene-styrene block copolymer containing up to 60% by weight of the styrene, wherein the unsaturation of the butadiene is less than 10% of the original unsaturation and, at least one-half of the total amount of the block copolymer by weight has maleic anhydride groups free-radically grafted to the hydrogenated butadiene blocks; and a room temperature Notched Izod impact strength of at least 18.4 ft. lb/in.

2. The polymer composition of claim 1, wherein:
the total amount of the block copolymer is grafted with maleic anhydride groups.

3. The polymer composition of claim 2, wherein the amount of the maleic anhydride groups is 1.6 % by weight of the block copolymer.

4. The polymer composition of claim 3, wherein the block copolymer comprises 29 % by weight of the styrene.

5. The polymer composition of claim 4, wherein the impact strength is 22.9 ft. lb/in.

6. The polymer composition of claim 1, wherein the unsaturation of the butadiene is less than 5 % of the original unsaturation.

* * * * *

UNITED STATES PATENT AND TRADEMARK OFFICE
CERTIFICATE OF CORRECTION

PATENT NO. : 5,506,299

DATED : April 9, 1996

INVENTOR(S) : Richard Gelles, William P. Gergen, Robert G. Lutz and Michael J. Modic It is certified that error appears in the above-identified patent and that said Letters Patent is hereby corrected as shown below:

The listing of inventors is in error and should read as follows:

Inventors: Richard Gelles,
William P. Gergen, both of Houston, TX and
Robert G. Lutz, Santa Rosa, CA Signed and Sealed this Eighteenth Day of June, 1996

Attest:

BRUCE LEHMAN

*Attesting Officer*          *Commissioner of Patents and Trademarks*